(12) United States Patent
Liu et al.

(10) Patent No.: US 12,153,261 B2
(45) Date of Patent: Nov. 26, 2024

(54) EDGE COUPLER AND WAVEGUIDE STRUCTURE AND FORMING METHOD THEREOF

(71) Applicant: TAIWAN SEMICONDUCTOR MANUFACTURING COMPANY LTD., Hsinchu (TW)

(72) Inventors: Wei-Kang Liu, Taichung (TW); Chih-Tsung Shih, Hsinchu (TW); Hau-Yan Lu, Hsinchu (TW); Yingkit Felix Tsui, Cupertino, CA (US)

(73) Assignee: TAIWAN SEMICONDUCTOR MANUFACTURING COMPANY LTD., Hsinchu (TW)

( * ) Notice: Subject to any disclaimer, the term of this patent is extended or adjusted under 35 U.S.C. 154(b) by 202 days.

(21) Appl. No.: 17/812,192

(22) Filed: Jul. 13, 2022

(65) Prior Publication Data

US 2024/0019639 A1    Jan. 18, 2024

(51) Int. Cl.
*G02B 6/122*  (2006.01)
*G02B 6/12*  (2006.01)
*G02B 6/30*  (2006.01)

(52) U.S. Cl.
CPC .......... *G02B 6/305* (2013.01); *G02B 6/1228* (2013.01); *G02B 2006/12147* (2013.01)

(58) Field of Classification Search
CPC ..................................................... G02B 6/327
See application file for complete search history.

(56) References Cited

U.S. PATENT DOCUMENTS

| | | | | |
|---|---|---|---|---|
| 6,788,853 | B2 * | 9/2004 | Steinberg | G02B 6/122 385/49 |
| 6,907,166 | B2 * | 6/2005 | Thoma | G02B 6/241 385/38 |
| 9,835,801 | B1 * | 12/2017 | Qian | G02B 6/262 |
| 10,120,133 | B2 * | 11/2018 | Golper | G02B 6/30 |
| 2023/0314718 | A1 * | 10/2023 | Liu | G02B 6/4202 385/43 |
| 2024/0019639 | A1 * | 1/2024 | Liu | G02B 6/1228 |

* cited by examiner

*Primary Examiner* — Rhonda S Peace
(74) *Attorney, Agent, or Firm* — WPAT LAW; Anthony King

(57) ABSTRACT

An edge coupler, a waveguide structure and a method for forming a waveguide structure are provided. The edge coupler includes a substrate, a first cladding layer, a core layer and a first anti-reflection coating layer. The first cladding layer has a second sidewall aligned with a first sidewall of the substrate. The core layer has a third sidewall aligned with the second sidewall. The anti-reflection coating layer lines the first sidewall, the second sidewall and the third sidewall. A thickness of the anti-reflection coating layer varies along the first sidewall, the second sidewall and the third sidewall.

20 Claims, 37 Drawing Sheets

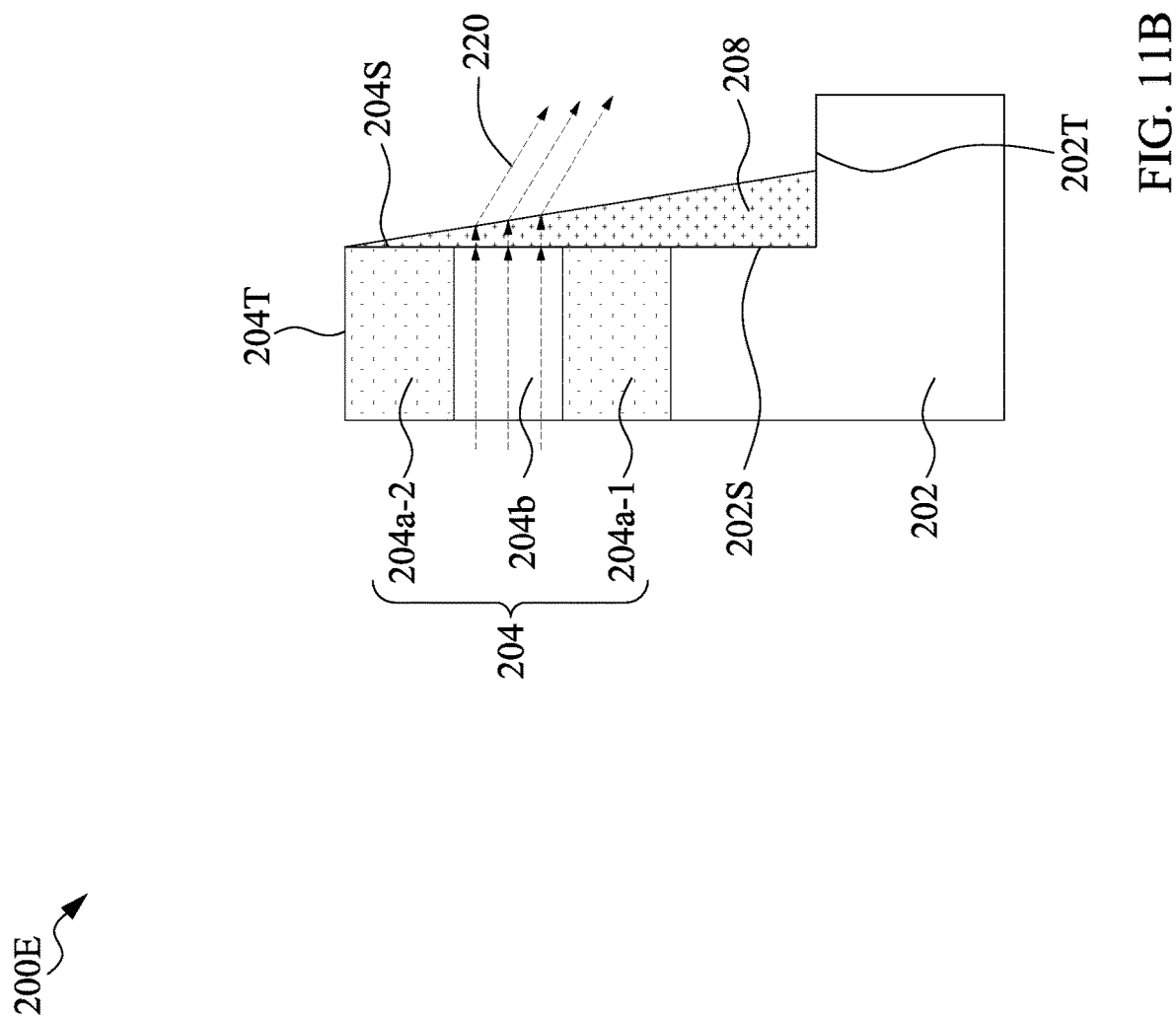

EDGE COUPLER AND WAVEGUIDE STRUCTURE AND FORMING METHOD THEREOF

BACKGROUND

Optical signals are used for various applications, including high-speed secure data transmission between two devices. In some applications, a device capable of optical data transmission includes at least an integrated circuit (IC or "chip") having a laser die for transmitting and/or receiving optical signals. In addition, the device usually has one or more other photonic (optical) or electrical components, a waveguide for the transmission of the optical signals, and a support, such as a substrate of a printed circuit board, on which the chip equipped with the laser die and the one or more other components are mounted. Performance of the photonic or optical components may be affected due to optical loss during the transmission of the optical signals between different optical components.

BRIEF DESCRIPTION OF THE DRAWINGS

Aspects of the embodiments of the present disclosure are best understood from the following detailed description when read with the accompanying figures. It should be noted that, in accordance with the standard practice in the industry, various structures are not drawn to scale. In fact, the dimensions of the various structures may be arbitrarily increased or reduced for clarity of discussion.

FIGS. 11A and 11B are schematic drawings respectively illustrating waveguide structures according to aspects of the present disclosure in one or more embodiments.

DETAILED DESCRIPTION

Figure 1:
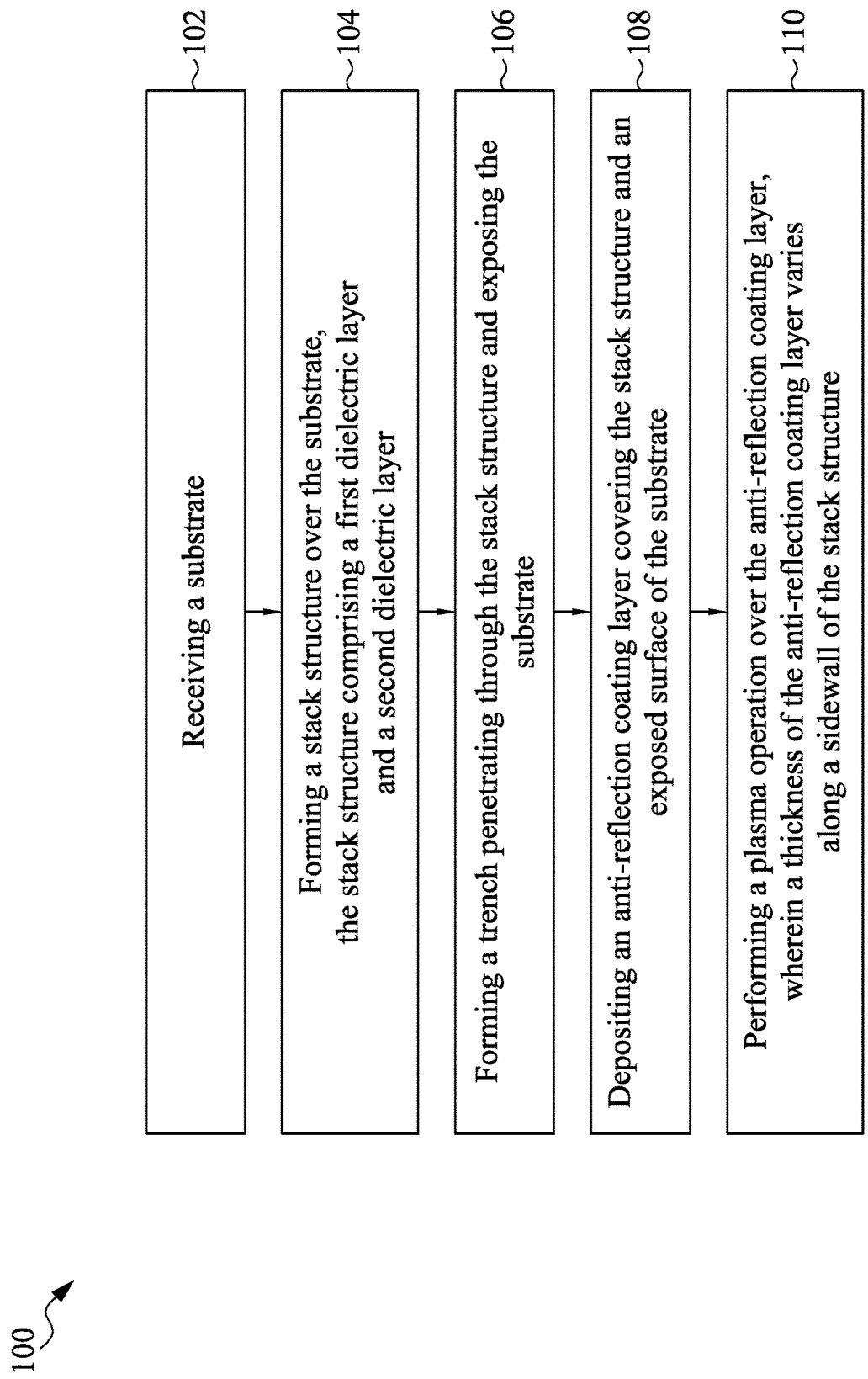
FIG. 1 is a flowchart representing a method for manufacturing a waveguide structure according to aspects of one or more embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed. The specific embodiments discussed are merely illustrative of specific ways to make and use the embodiments, and do not limit the scope of the disclosure. Throughout the various views and illustrative embodiments, like reference numerals are used to designate like elements. Reference will now be made in detail to exemplary embodiments illustrated in the accompanying drawings. Wherever possible, the same reference numbers are used in the drawings and the description to refer to the same or like parts. In the drawings, the shape and thickness may be exaggerated for clarity and convenience. It should be appreciated that the following figures are not drawn to scale; rather, these figures are merely intended for illustration.

Further, spatially relative terms, such as "beneath," "below," "lower," "above," "over," "upper," "on," and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

As used herein, although the terms such as "first," "second" and "third" describe various elements, components, regions, layers and/or sections, these elements, components, regions, layers and/or sections should not be limited by these terms. These terms may be only used to distinguish one element, component, region, layer or section from another. The terms such as "first," "second" and "third" when used herein do not imply a sequence or order unless clearly indicated by the context.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in the respective testing measurements. Also, as used herein, the terms "substantially," "approximately" or "about" generally mean within a value or range that can be contemplated by people having ordinary skill in the art. Alternatively, the terms "substantially," "approximately" or "about" mean within an acceptable standard error of the mean when considered by one of ordinary skill in the art. People having ordinary skill in the art can understand that the acceptable standard error may vary according to different technologies. Other than in the operating/working examples, or unless otherwise expressly specified, all of the numerical ranges, amounts, values and percentages such as those for quantities of materials, durations of times, temperatures, operating conditions, ratios of amounts, and the likes thereof disclosed herein should be understood as modified in all instances by the terms "substantially," "approximately" or "about." Accordingly, unless indicated to the contrary, the numerical parameters set forth in the present disclosure and attached claims are approximations that can vary as desired. At the very least, each numerical parameter should be construed in light of the number of reported significant digits and by applying ordinary rounding techniques. Ranges can be expressed herein as being from one endpoint to another endpoint or between two endpoints. All ranges disclosed herein are inclusive of the endpoints, unless specified otherwise.

Integrated optical waveguides (or edge couplers) are often used in photonic integrated circuits. Generally, an integrated optical waveguide consists of an optical medium having a high dielectric constant (i.e., a core layer), which is surrounded by a medium having a low dielectric constant (i.e., a cladding layer). Light is guided along a length of the waveguide by way of total internal reflection due to a difference in dielectric constants between the optical medium (i.e., the core layer) and the surrounding medium (i.e., the cladding layer). The photonic integrated circuits use the optical waveguides to transmit and/or receive optical signals from different devices. The optical waveguide may be coupled to an optical fiber to allow optical communication between the photonic circuits. Although existing optical waveguides have been generally adequate for their intended purpose, such optical waveguides have not been entirely satisfactory in all aspects. For example, coupling efficiency of such optical waveguides is usually low due to a vertical facet profile of such optical waveguides. As a result, additional lens fibers are often needed so as to improve the coupling efficiency of such optical waveguides and improve a beam profile of the optical signals. Accordingly, an alternative approach to forming the optical waveguides is therefore of primary importance.

Some embodiments of the present disclosure provide an edge coupler, a waveguide structure and a method for forming a waveguide structure that provide one or more improvements over existing approaches. By forming an anti-reflection coating (ARC) layer as introduced below, a thickness of the ARC layer may vary along the core layer. Accordingly, optical signals transmitted through the ARC layer may converge or diverge, such that a beam pointing (or beam profile) of the waveguide structure may be improved. Furthermore, a broader wavelength range of optical signals may be collected through the ARC layer, such that the coupling efficiency of the waveguide structure may be improved.

FIG. 1 is a flowchart representing a method 100 for manufacturing a waveguide structure according to aspects of one or more embodiments of the present disclosure. The method 100 includes an operation 102, in which a substrate is received. The method 100 includes an operation 104, in which a stack structure is formed over the substrate. In some embodiments, the stack structure includes a first layer and a second layer. The method 100 includes an operation 106, in which a trench penetrating through the stack structure and exposing the substrate is formed. The method 100 includes an operation 108, in which an anti-reflection coating layer covering the stack structure and an exposed surface of the substrate is deposited. The method 100 includes an operation 110, in which a plasma operation is performed over the anti-reflection coating layer. In some embodiments, a thickness of the anti-reflection coating layer varies along a sidewall of the stack structure. The method 100 will be further described according to one or more embodiments. It should be noted that the operations of the method 100 may be rearranged or otherwise modified within the scope of the various aspects. It should further be noted that additional processes may be provided before, during, and after the method 100, and that some other processes may only be briefly described herein. Thus, other implementations are possible within the scope of the various aspects described herein.

FIGS. 2 to 4, 5A, 5B, 6A, 6B and 7 are schematic drawings illustrating a waveguide structure 200 at various fabrication stages constructed according to aspects of the present disclosure in one or more embodiments.

Figure 2:
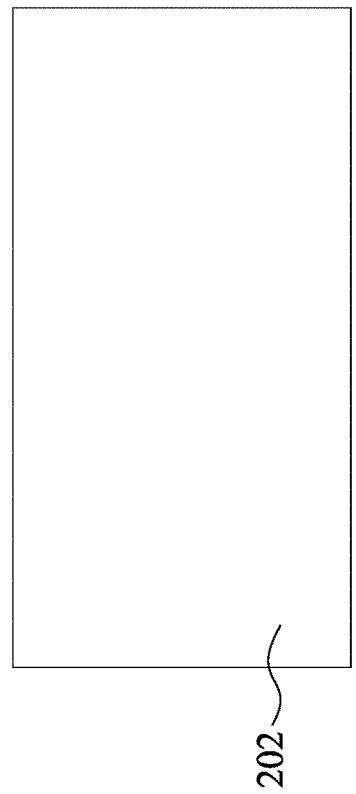
FIGS. 2-4, 5A-5B, 6A-6B and 7 are schematic drawings illustrating a waveguide structure at various fabrication stages constructed according to aspects of the present disclosure in one or more embodiments.

Referring to FIG. 2, a substrate 202 is provided or received. The respective step is shown as the operation 102 of the method 100 in FIG. 1. In some embodiments, the substrate 202 may be a semiconductor substrate. Alternatively, the substrate 202 includes at least one of an epitaxial layer, a silicon-on-insulator (SOI) structure, a wafer, and a die formed from a wafer. Other structures and/or configurations of the substrate 202 are within the scope of the present disclosure. The substrate 202 may include at least one of silicon, germanium, carbide, arsenide, gallium, arsenic, phosphide, indium, antimonide, SiGe, SiC, GaAs, GaN, GaP, InGaP, InP, InAs, InSb, GaAsP, AlInAs, AlGaAs, GaInAs, GaInAs, GaInAsP, or other suitable material. According to some embodiments, the substrate 202 includes monocrystalline silicon, crystalline silicon with a <100> crystallographic orientation, crystalline silicon with a <110> crystallographic orientation, or another suitable material. In some embodiments, the substrate 202 includes at least one doped region.

Figure 3:
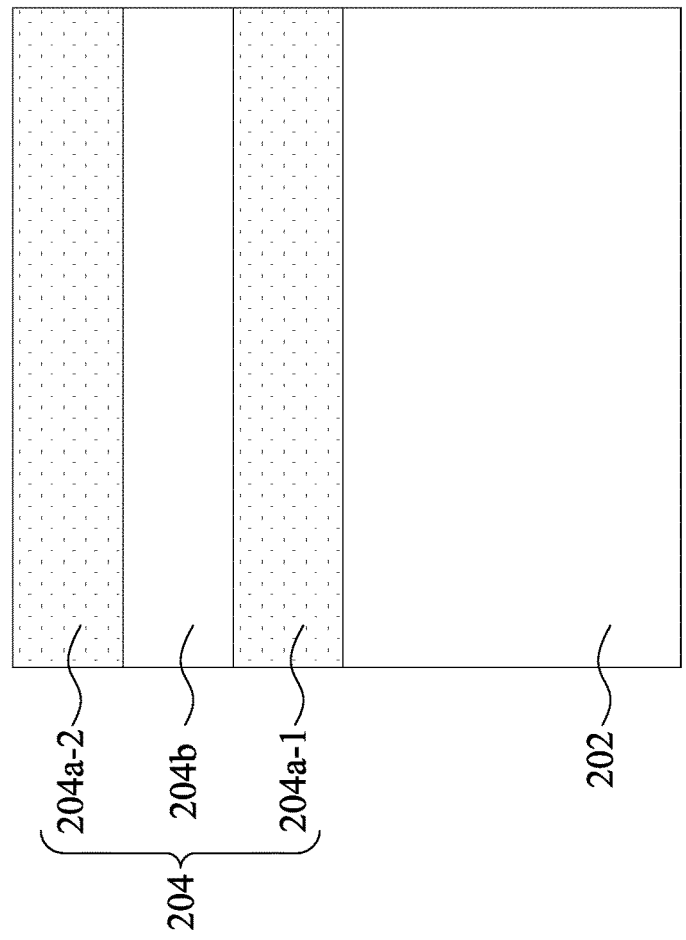

Referring to FIG. 3, a stack structure 204 is formed over the substrate 202. The respective step is shown as the operation 104 of the method 100 in FIG. 1. The stack structure 204 may include alternating layers having different compositions. For example, in some embodiments, the stack structure 204 includes layers 204a of a first composition alternating with layers 204b having a second composition. The stack structure 204 may include one or more layers 204a and one or more layers 204b. Although two layers 204a (i.e., 204a-1 and 204a-2) and one layer 204b are shown, it should be understood that the stack structure 204 may include any number of layers of any suitable composition with various examples including between 2 and 10 layers 204a and between 2 and 10 layers 204b. The compositions of the layers in the stack structure 204 (e.g., the layers 204a and the layers 204b) may have different refractive indexes, dielectric constants, etchant sensitivities, and/or other differing properties. In some embodiments, a second refractive index of the layer 204b is greater than a first refractive index of the layer 204a. The layers 204a and 204b may have thicknesses chosen based on device performance considerations. In some embodiments, the layers 204a are substantially uniform in thickness, and the layers 204b are substantially uniform in thickness. In some embodiments, the thickness of the layers 204a may be greater than the thickness of the layers 204b, but the disclosure is not limited thereto.

In some embodiments, the layer 204a is a dielectric layer, while the layer 204b is a semiconductor layer. The layer 204a may be referred to as an insulating layer, while the layer 204b may be referred to as an active layer. In some embodiments, the layer 204a-1 includes a buried oxide layer, while the layer 204b includes a silicon layer. The layer 204a-1, the layer 204b and the substrate 202 may together be referred to as an SOI substrate. In some embodiments, the layer 204a-2 is referred to as a dielectric layer formed over the SOI substrate (i.e., 202, 204a, and 204b). In some embodiments, the layer 204b is configured as a core layer of the waveguide structure 200, while the layers 204a-1 and 204a-2 are configured as cladding layers of the waveguide structure 200. Light is transmitted through the layer 204b according to the total internal reflection (TIR) principle, and the layer 204b has a refractive index slightly higher than that of the outer layers 204a-1 and 204a-2.

Figure 4:
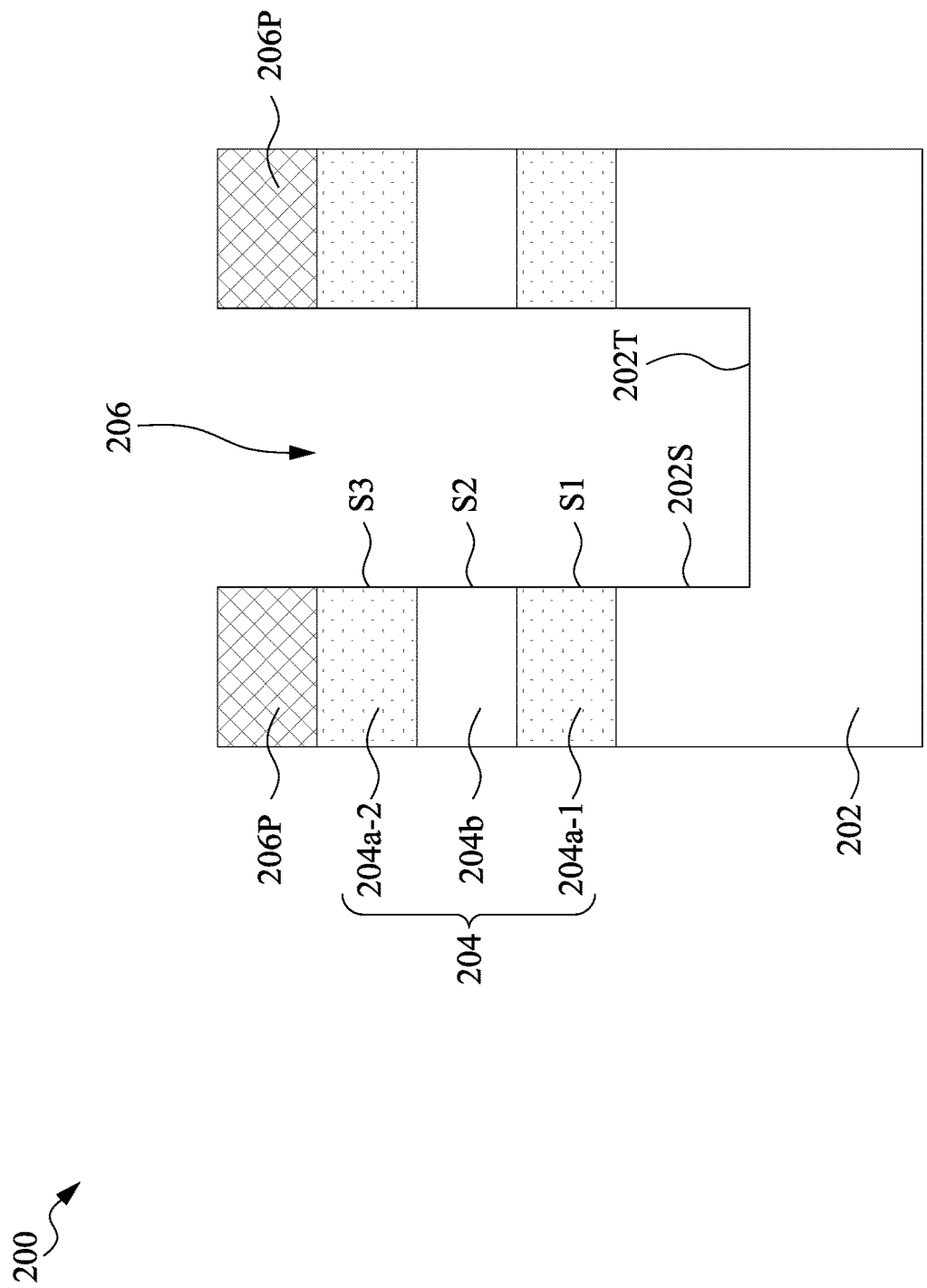

Referring to FIG. 4, a trench 206 is formed. The respective step is shown as the operation 106 of the method 100 in FIG. 1. In some embodiments, the trench 206 penetrates through the stack structure 204 and exposes the substrate 202. In some embodiments, a patterned protecting layer 206P is formed over the stack structure 204 for defining a location and a dimension of the trench 206. The patterned protecting layer 206P serves as an etching mask for forming the trench 206. The patterned protecting layer 206P may be removed after the formation of the trench 206. In some embodiments, a surface (or a top surface) 202T of the substrate 202 is exposed through the trench 206. Alternatively or additionally, a sidewall 202S of the substrate 202 may also be exposed through the trench 206. The layer 204a-1 has a sidewall S1 aligned with the sidewall 202S of the substrate 202. The layer 204b has a sidewall S2 aligned with the sidewall S1. The layer 204a-2 has a sidewall S3 aligned with the sidewall S2.

Figure 5A:
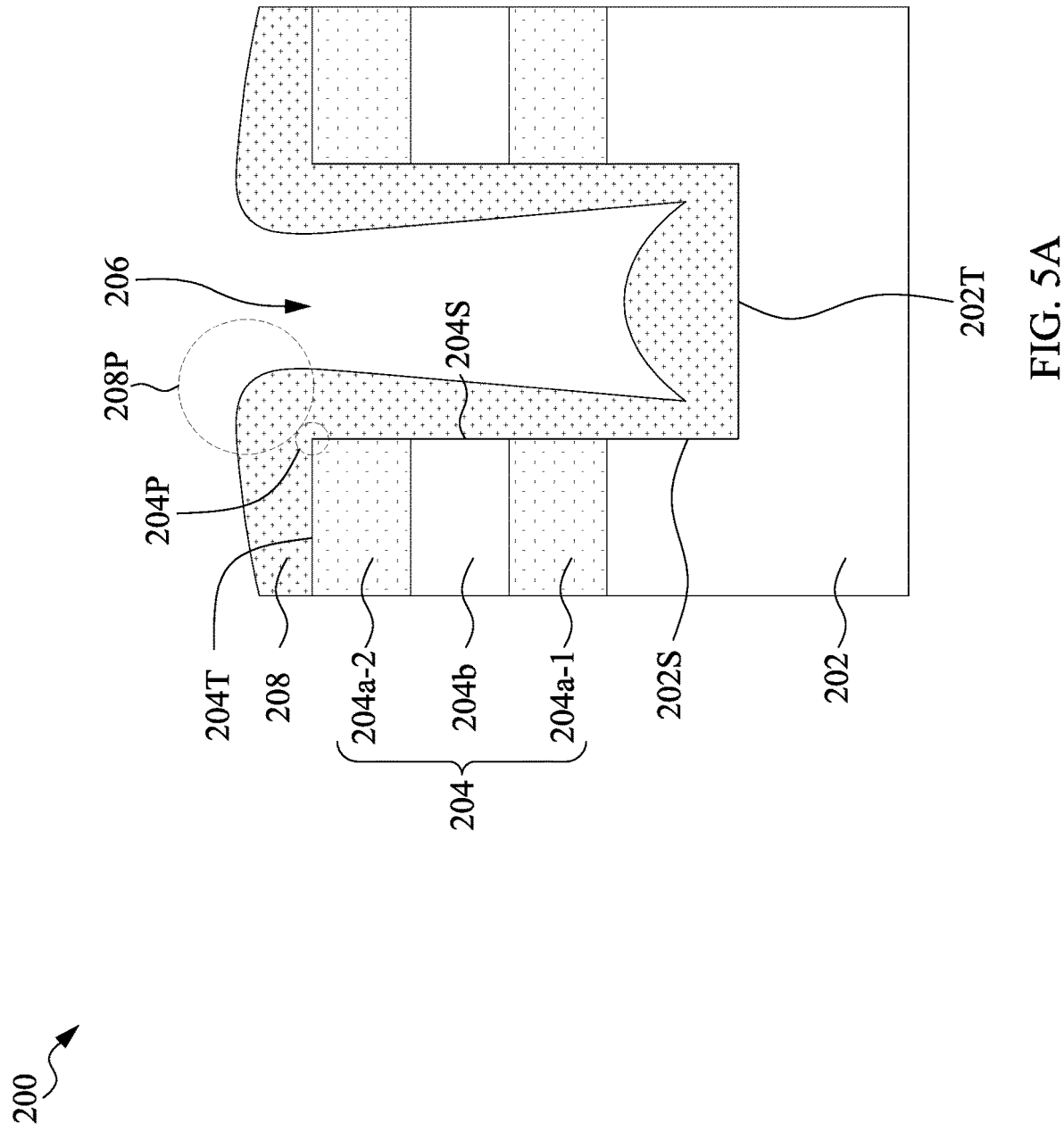
Figure 5B:
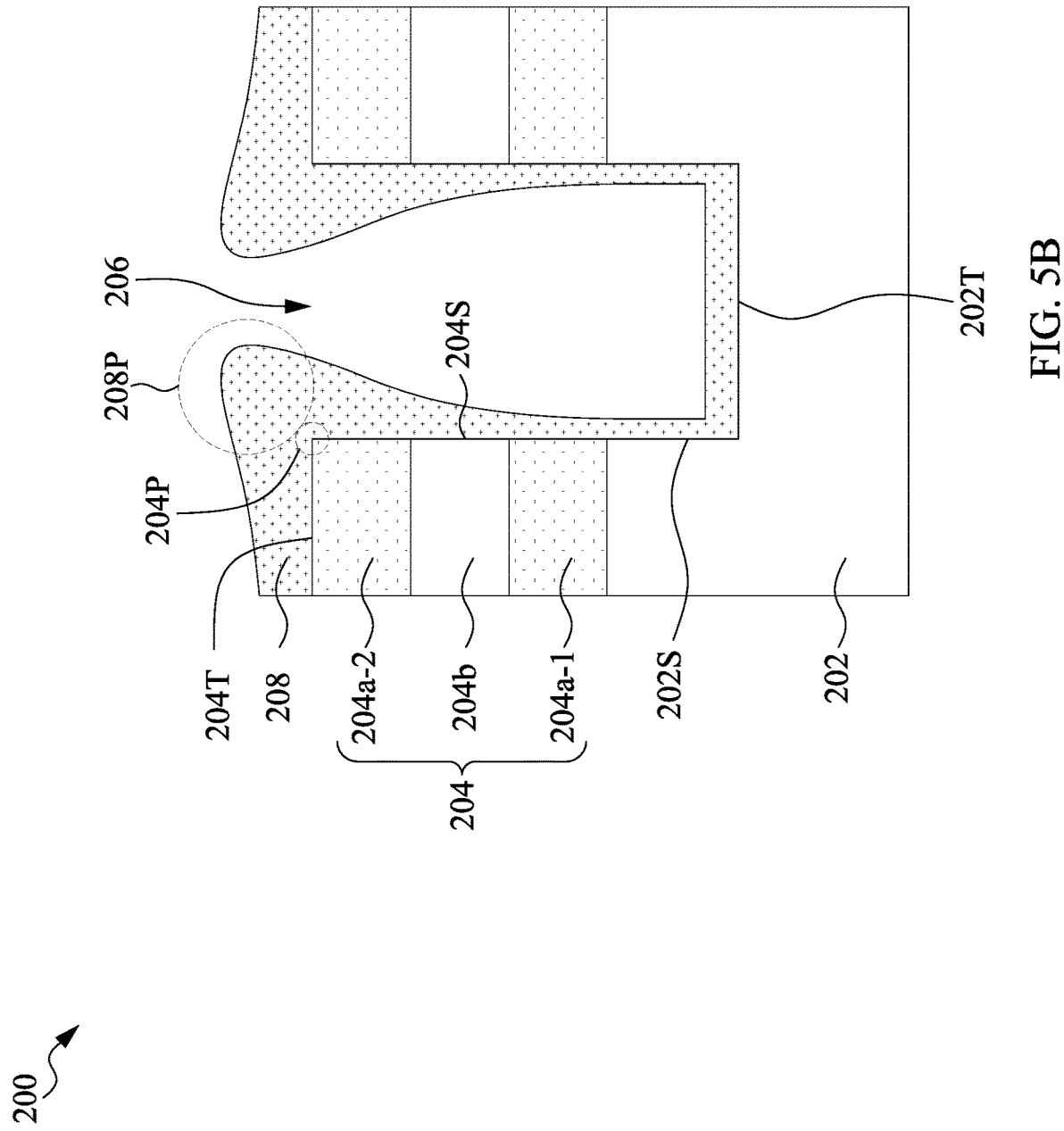

Referring to FIGS. 5A and 5B, an anti-reflection coating (ARC) layer 208 is deposited. The respective step is shown as the operation 108 of the method 100 in FIG. 1, In some embodiments, the ARC layer 208 covers the stack structure 204 and the exposed surface 202T of the substrate 202. Additionally, the ARC layer 208 may cover a top surface 204T of the stack structure 204 and sidewalls 204S (including the sidewalls S1, S2 and S3) of the stack structure 204. In some embodiments, the ARC layer 208 physically contacts the top surface 204T of the stack structure 204 and the sidewalls 204S of the stack structure 204. The ARC layer 208 lines the sidewalls 204S of the stack structure 204. In some embodiments, a thickness of the ARC layer 208 on the sidewall 204S of the stack structure 204 may increase upwardly from a bottom of the trench 206 (i.e., the surface 202T of the substrate 202) to the top surface 204T of the stack structure 204. In other words, the ARC layer 208 has an overhang profile. In some embodiments, the ARC layer 208 may be formed by one or more deposition operations. For example, the ARC layer 208 may be deposited over the stack structure 204 and the substrate 202 by a chemical vapor deposition (CVD) operation, a physical vapor deposition (PVD) operation, an atomic layer deposition (ALD) operation or other suitable operations. In some embodiments, depending on different design requirements, the ARC layer 208 may have different profiles as shown in FIGS. 5A and 5B. In some embodiments as shown in FIG. 5A, a height of the ARC layer 208 on the surface 202T of the substrate 202 may vary along the surface 202T of the substrate 202. In some embodiments as shown in FIG. 5B, a height of the ARC layer 208 on the surface 202T of the substrate 202 is uniform along the surface 202T of the substrate 202.

In some embodiments, the second refractive index of the layer 204b) is greater than a refractive index of the ARC layer 208, Additionally or alternatively, the refractive index of the ARC layer 208 is greater than a refractive index of the environment (e.g., air). In some embodiments, the refractive index of the ARC layer 208 is substantially in a range between 1 and 3.5. In some embodiments, a material of the ARC layer 208 may include $SiO_2$, SiO, $TiO_2$, $Ta_2O_5$, $MgF_2$, a-$SiN_x$ or other suitable anti-reflection materials. In some embodiments, the ARC layer 208 may be a single-layered structure. Alternatively, the ARC layer 208 may be a multi-layered structure. Following description continues with respect to FIG. 5A. It should be understood that similar operations may also be applied to the waveguide structure shown FIG. 5B.

Figure 6A:
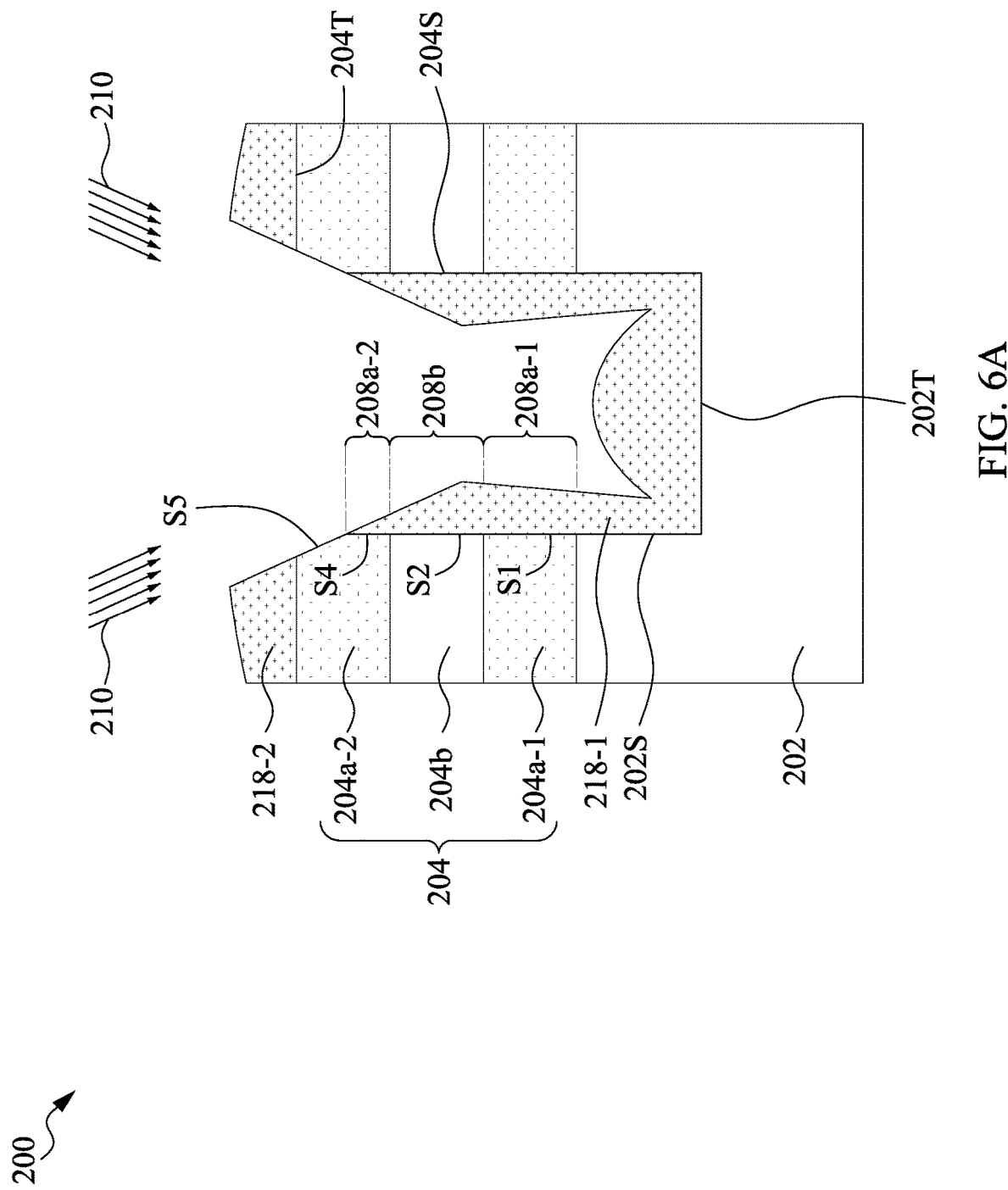
Figure 6B:
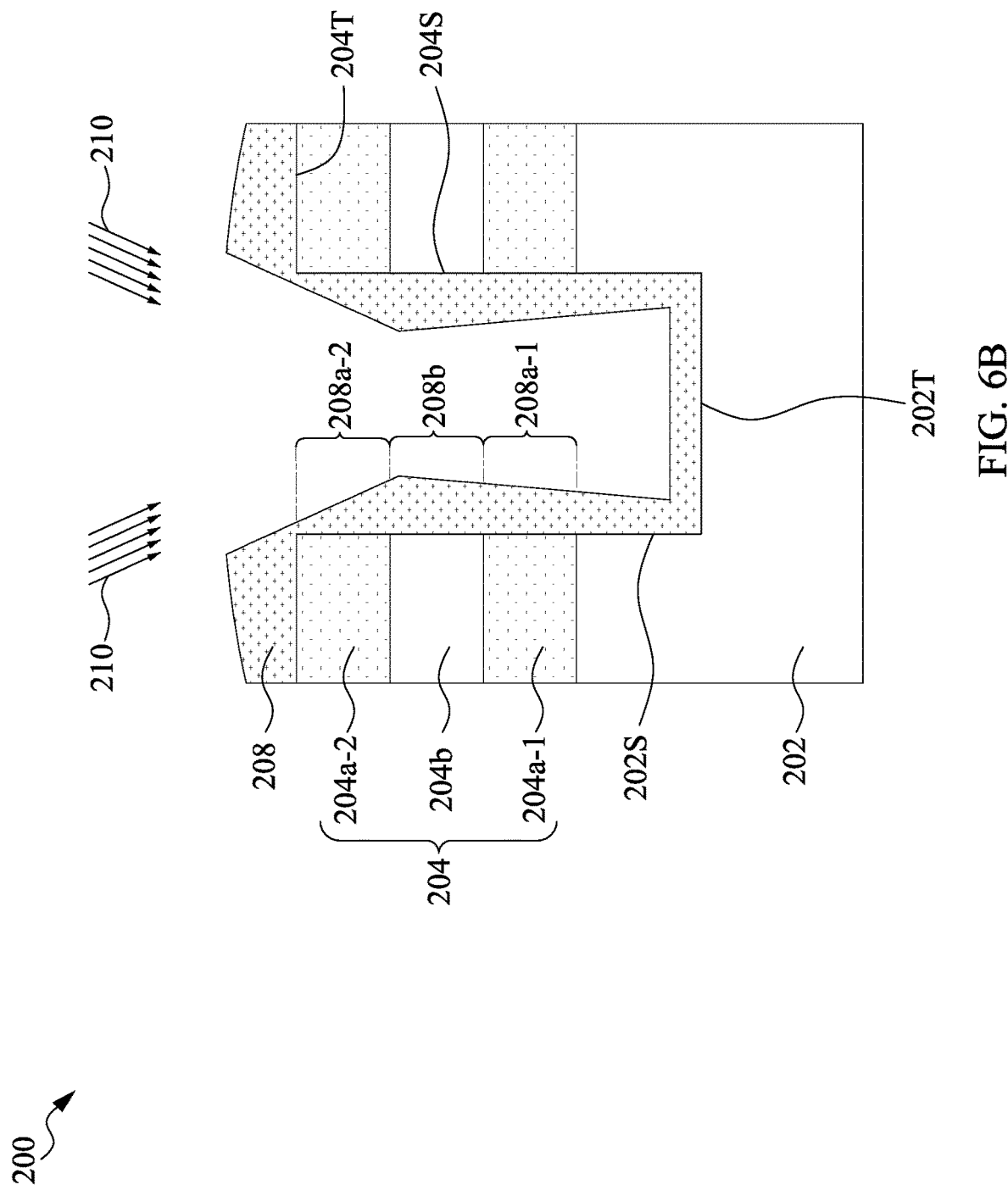

Referring to FIGS. 6A and 6B, one or more plasma operations 210 may be performed over the ARC layer 208. The respective step is shown as the operation 110 of the method 100 in FIG. 1. In some embodiments, at least a portion 208P of the ARC layer 208 is removed after the plasma operation 210. In some embodiments, the plasma operation 210 includes striking the portion 208P of the ARC layer 208 with a significant portion of charged particles, such as ions and/or electrons. In some embodiments, the plasma operation 210 also removes a portion of the ARC layer 208 over the top surface 202T of the substrate 202. Hence, a height of the ARC layer 208 over the top surface 202T of the substrate 202 may vary along the top surface 202T of the substrate 202. Alternatively or additionally, depending on different design requirements, the height of the ARC layer 208 over the top surface 202T of the substrate 202 may be substantially uniform along the top surface 202T of the substrate 202.

In some embodiments, depending on different design requirements, the ARC layer 208 may have different profiles as shown in FIGS. 6A and 6B. In some embodiments as shown in FIG. 6A, a portion 204P of the stack structure 204 is also removed after the plasma operation 210. In such embodiments, the ARC layer 208 may be separated into two discrete portions 218-1 and 218-2. The portion 218-1 of the ARC layer 208 covers the sidewall of the layer 204a-1, the sidewall of the layer 204b, and a portion of the sidewall of the layer 204a-2. The portion 218-2 of the ARC layer 208 covers the top surface 204T of the stack structure 204. In some embodiments, the layer 204a-2 has a vertical sidewall S4 aligned with the sidewall S2 of the layer 204b and a tilted sidewall S5 coupled with the vertical sidewall S4. In some embodiments, a thickness of the portion 218-1 of the ARC layer 208 varies along the sidewall 202S, the sidewall S1, the sidewall S2 and the vertical sidewall S4. In some embodiments, a height of the portion 218-2 of the ARC layer 208 varies along a top surface of the layer 204a-2. In some embodiments as shown in FIG. 6B, the stack structure 204 remains substantially intact after the plasma operation 210. In some embodiments, the ARC layer 208 may continuously cover the top surface 204T and the sidewall 204S of the stack structure 204. Alternatively, the ARC layer 208 is separated into two discrete portions, while the stack structure 204 remains substantially intact after the plasma operation 210. In some embodiments, after the plasma operation 210, a height of the ARC layer 208 on the top surface 202T of the substrate 202 is uniform along the top surface 202T of the substrate 202.

In some embodiments, after the removal of the portion 208P of the ARC layer 208, a thickness of the ARC layer 208 varies along the sidewall 204S of the stack structure 204. In some embodiments, the ARC layer 208 has a widest portion 208b corresponding to the layer 204b. In some embodiments, a thickness of the portion 208b varies along a sidewall of the layer 204b. In some embodiments, the portion 208b is tapered toward the top surface 202T of the substrate 202 and the top surface 204T of the stack structure 204. Furthermore, the ARC layer 208 has two taper portions 208a-1 and 208a-2 corresponding to the layer 204a-1 and the layer 204a-2, respectively. In some embodiments, a thickness of the taper portion 208a-1 corresponding to the layer 204a-1 is decreased from the widest portion 208b to the top surface 202T of the substrate 202. Additionally, a thickness of the taper portion 208a-2 corresponding to the layer 204a-1 is decreased from the widest portion to the top surface 2041 of the stack structure 204. In some embodiments, the ARC layer 208 has an asymmetric profile (i.e., a vertically-asymmetrical profile) as shown in FIGS. 6A and 6B. Alternatively, the ARC layer 208 has a symmetric profile after the plasma operation 210.

The thickness of the ARC layer 208 may be related to a wavelength of a transmitted optical signal. Owing to the thickness variation of the ARC layer 208 along a sidewall of the layer 204b (i.e., the core layer), a broadband wavelength of optical signals may be transmitted through the ARC layer 208. In some embodiments, the wavelength of the optical signals is substantially in a range between 1300 nanometers and 1800 nanometers. The thickness of the ARC layer 208 may be selected such that a broadband wavelength of optical signals may be transmitted or collected through the ARC layer 208. In some embodiments, the thickness of the ARC layer 208 is substantially in a range between 150 nanometers and 250 nanometers.

Figure 7:
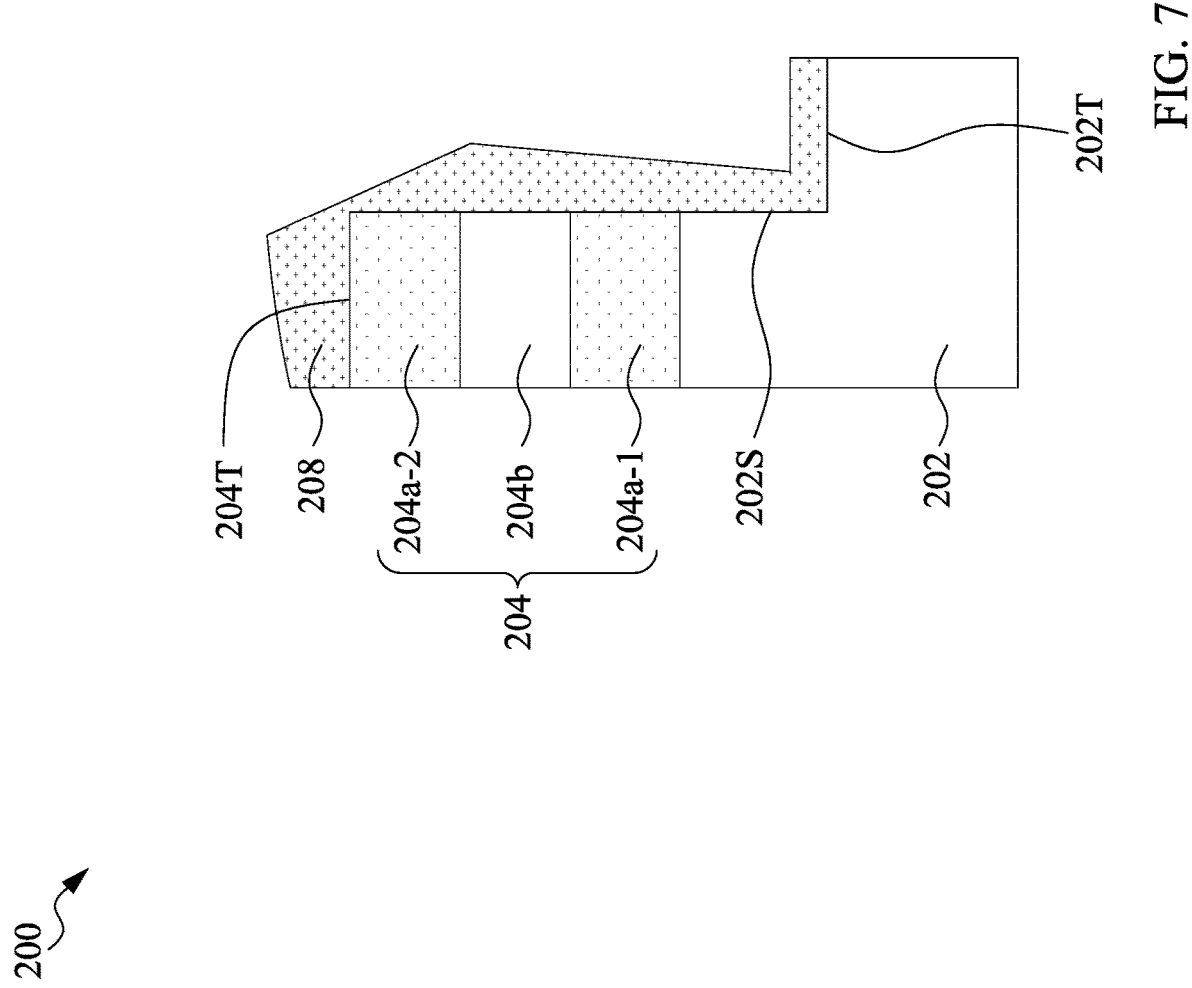

Referring to FIG. 7, in some embodiments, a sawing operation (or a dicing operation) is performed. In some embodiments, the substrate 202 is cut into individual components to form the waveguide structure 200. In some embodiments, the sawing operation is performed prior to the plasma operation 210, Alternatively, the sawing operation is performed after the plasma, operation 210. Accordingly, the waveguide structure 200 (sometimes referred to as an edge coupler) including the layers 204a-1, 204b, 204a-2 and the ARC layer 208 is formed. In some embodiments, additional operations may be performed to remove the portion of the ARC layer 208 over the layer 204a-2 or the portion of the ARC layer 208 over the substrate 202. In other words, the top surface 2041 of the stack structure 204 or the top surface 202T of the substrate 202 may be exposed. It should be understood that, although FIG. 7 illustrates a subsequent operation on the waveguide structure 200 shown in FIG. 6B, similar operations may also be applied to the waveguide structure 200 shown in FIG. 6A.

The present disclosure provides embodiments of methods for forming a waveguide structure that provide one or more improvements over existing approaches. By forming the ARC layer 208 as introduced above, the thickness of the ARC layer 208 may vary along the stack structure 204. Specifically, the thickness of the ARC layer 208 varies along the sidewall of the layer 204b (i.e., the core layer). Accordingly, optical signals transmitted through the ARC layer 208 may be configured to converge (as in a converging lens) or diverge (as in a diverging lens), such that the beam pointing (or the beam profile) of the waveguide structure 200 may be improved. Furthermore, a broader wavelength range of optical signals may be collected through the ARC layer 208, such that the coupling efficiency of the waveguide structure 200 may be improved.

Figure 8:
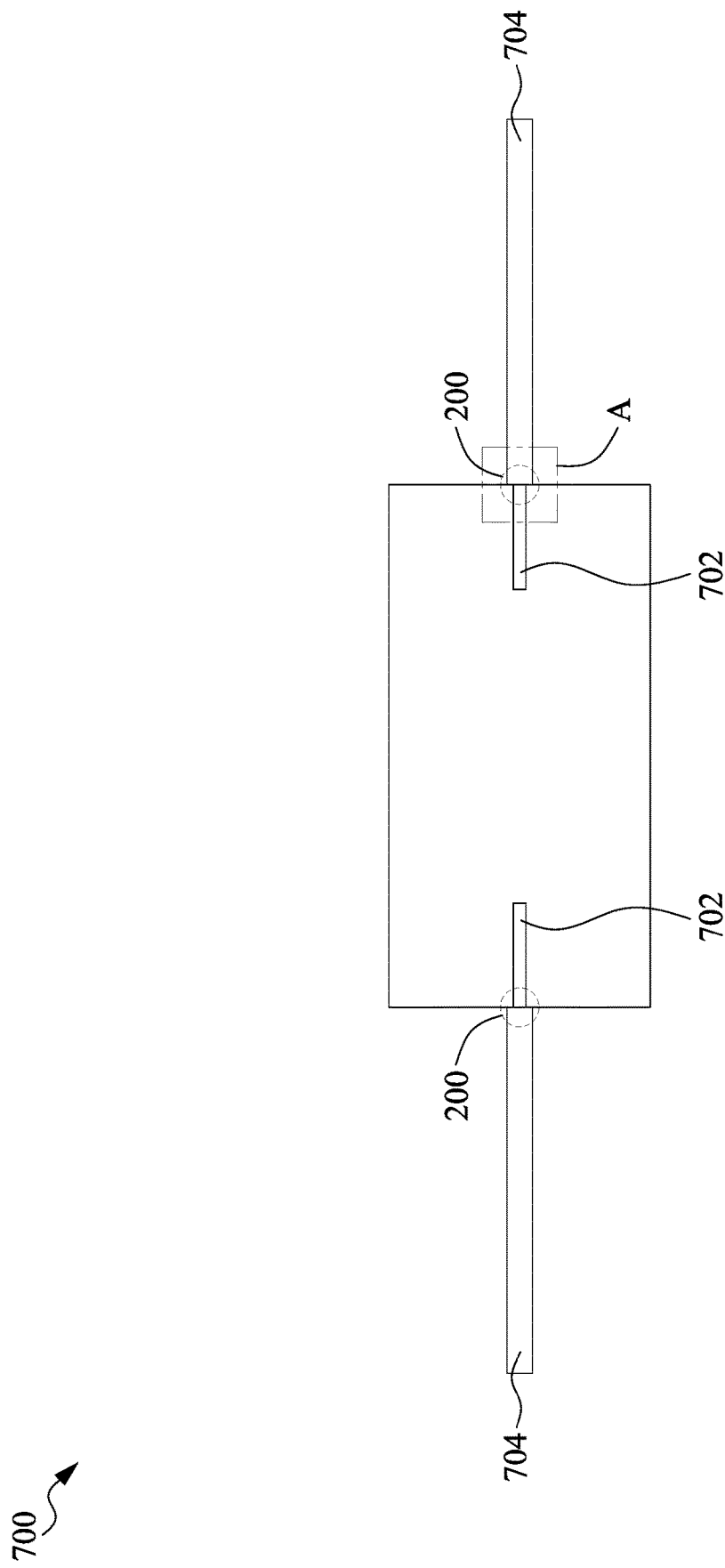
FIG. 8 is a schematic drawing illustrating a photonic integrated circuit according to aspects of the present disclosure in one or more embodiments.
Figure 9:
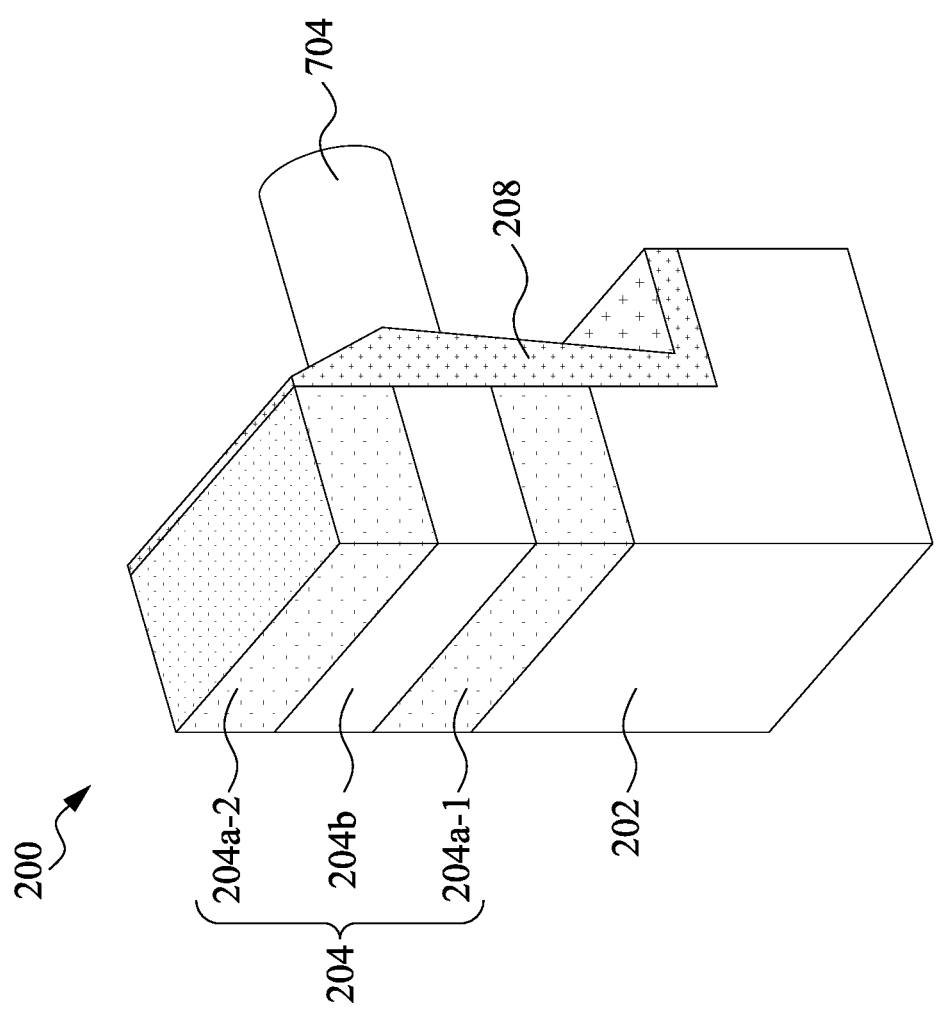
FIG. 9 is an enlarged view of FIG. 8 according to aspects of the present disclosure in one or more embodiments.

FIG. 8 is a schematic drawing illustrating a photonic integrated circuit according to aspects of the present disclosure in one or more embodiments. FIG. 9 is an enlarged view of a space A in FIG. 8 according to aspects of the present disclosure in one or more embodiments. Referring to FIGS. 8 and 9, the waveguide structure 200 may be integrated in a photonic integrated circuit (PIC) 700. The PIC 700 may include one or more photonic wires 702. Each of the photonic wires 702 may face an input/output optical fiber 704. For example, the optical fiber 704 on the left side may be configured as an input optical fiber, while the optical fiber 704 on the right side may be configured as an output optical fiber. The waveguide structure 200 may be provided or formed on the edge of each of the photonic wires 702 that faces the optical fiber 704. In some embodiments, the waveguide structure 200 physically contacts the respective optical fiber 704. Alternatively, an air gap is between the waveguide structure 200 and the optical fiber 704. In some embodiments, an adhesive (not shown) is provided to mount the optical fiber 704 on the PIC 700. The light coupling between optical fibers 704 and integrated waveguide structures 200 provides essential input-output interfaces for the PIC 700 and plays a crucial role in reliable optical signal transport for a number of applications, such as optical interconnects, optical switching, and integrated quantum optics. Due to a presence of the ARC layer 208, light-coupling properties, including coupling efficiency, bandwidth, and/or alignment tolerance, may be improved.

The structures of the present disclosure are not limited to the above-mentioned embodiments and may have other different embodiments. To simplify the description and for convenience of comparison between each of the embodiments of the present disclosure, identical (or like) components in each of the following embodiments are marked with identical (or like) numerals. For making it easier to compare differences between the embodiments, the following description will detail dissimilarities among different embodiments, while identical features, values and definitions will not be repeated.

Figure 10A:
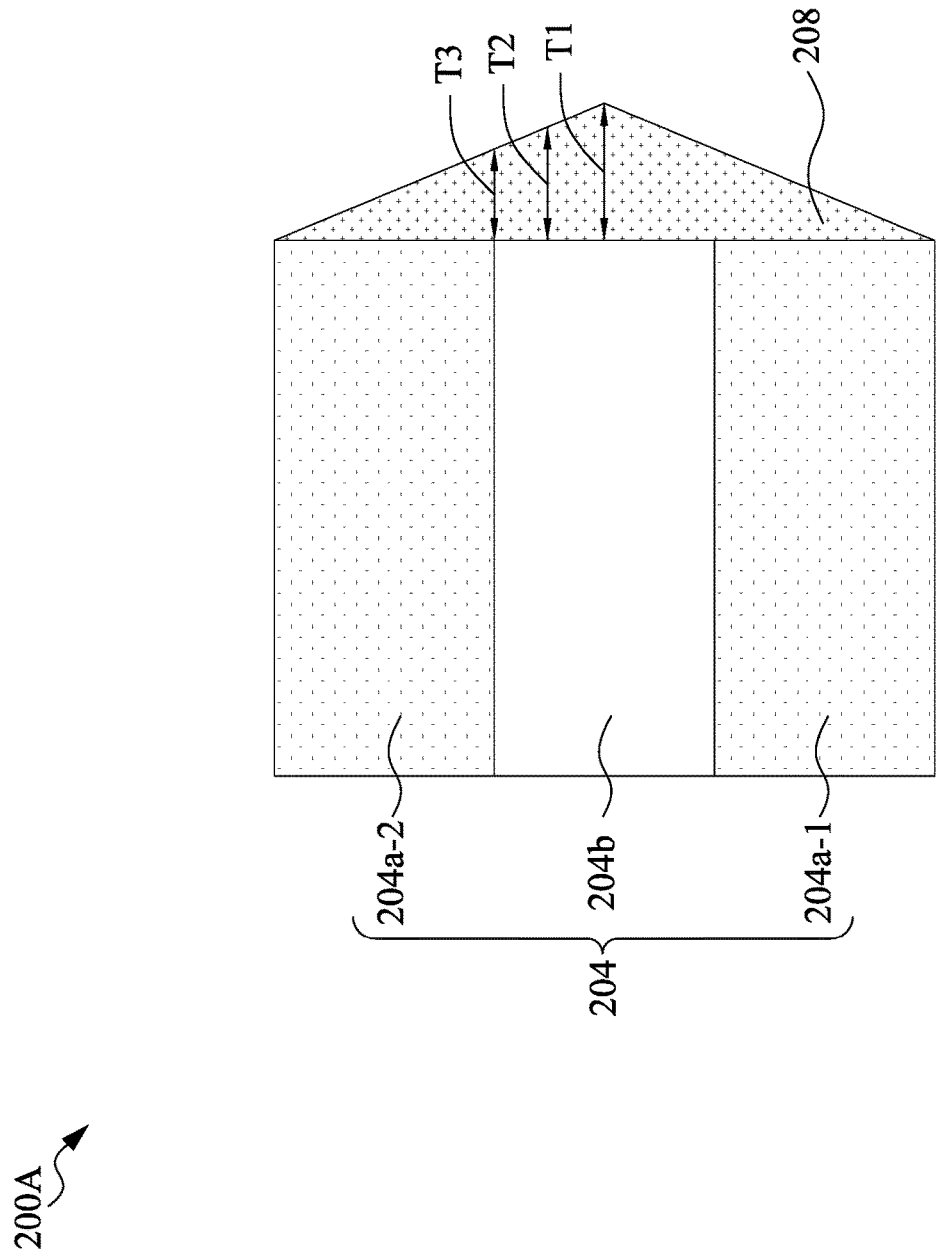
FIGS. 10A, 10B and 10C are schematic drawings respectively illustrating waveguide structures according to aspects of the present disclosure in one or more embodiments.
Figure 10B:
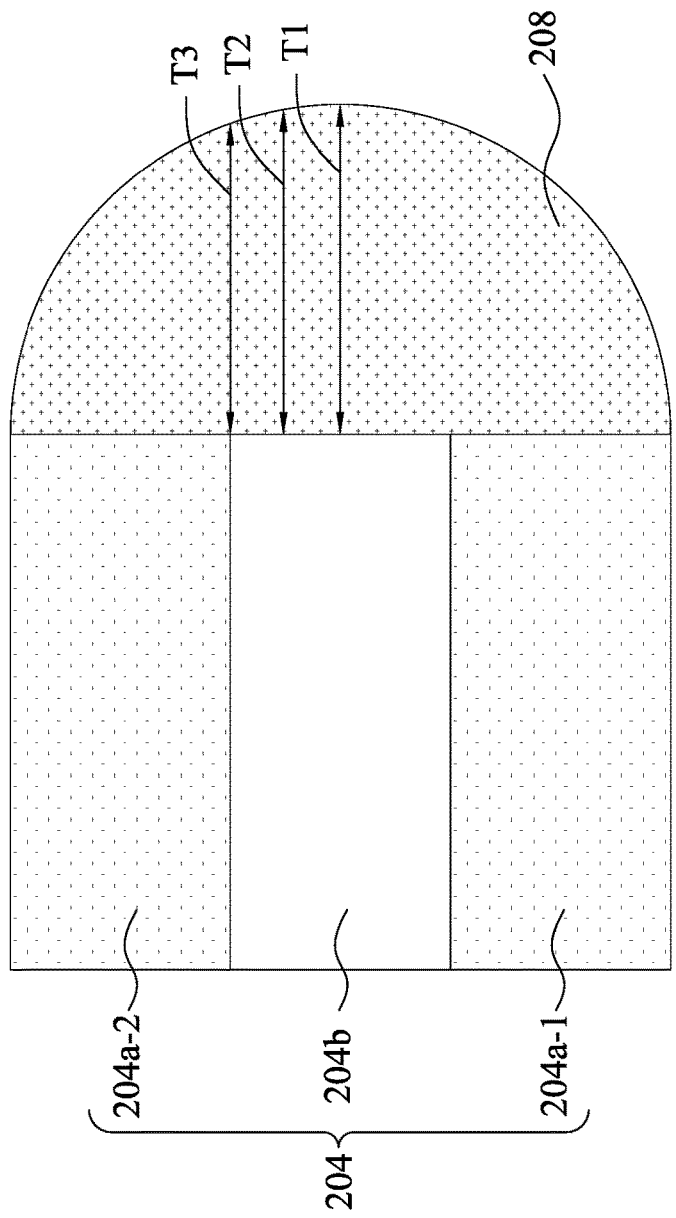
Figure 10C:
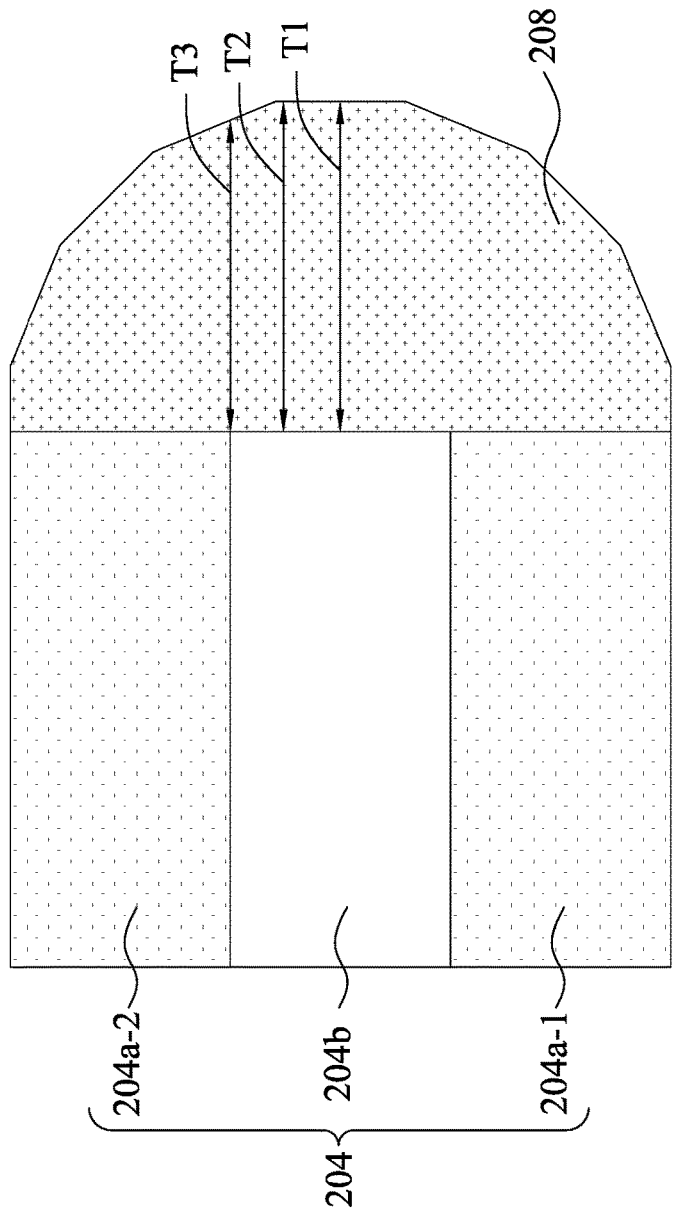

FIGS. 10A, 10B and 10C are schematic drawings respectively illustrating waveguide structures 200A, 200B and 200C according to aspects of the present disclosure in one or more embodiments. Referring, to FIGS. 10A, 10B and 10C, the ARC layer 208 may have a symmetric profile with respect to a center axis of the stack structure 204. In some embodiments, the ARC layer 208 has a symmetric profile with respect to a center axis of the layer 204b. In some embodiments as shown in FIG. 10A, the ARC layer 208 has a triangular cross-sectional profile. In some embodiments as shown in FIG. 10B, the ARC layer 208 has a semicircular cross-sectional profile. In some embodiments as shown in FIG. 10C, the ARC layer 208 has a polygonal cross-sectional profile.

In some embodiments, the ARC layer 208 has a thickness T1 corresponding to the center axis of the layer 204b, a thickness T3 corresponding to an upper surface of the layer 204b and a thickness T2 between the thickness T1 and the thickness T3. In some embodiments, the thickness T1 is greater than the thickness T2 and the thickness T3. The thicknesses T1, T2 and T3 of the ARC layer 208 may be selected such that a broadband wavelength of optical signals may be transmitted or collected through the ARC layer 208. In some embodiments, the thickness T1 of the ARC layer 208 is substantially in a range between 220 nanometers and 250 nanometers. In some embodiments, the thickness T2 of the ARC layer 208 is substantially in a range between 190 nanometers and 220 nanometers. In some embodiments, the thickness T3 of the ARC layer 208 is substantially in a range between 150 nanometers and 190 nanometers.

Figure 11A:
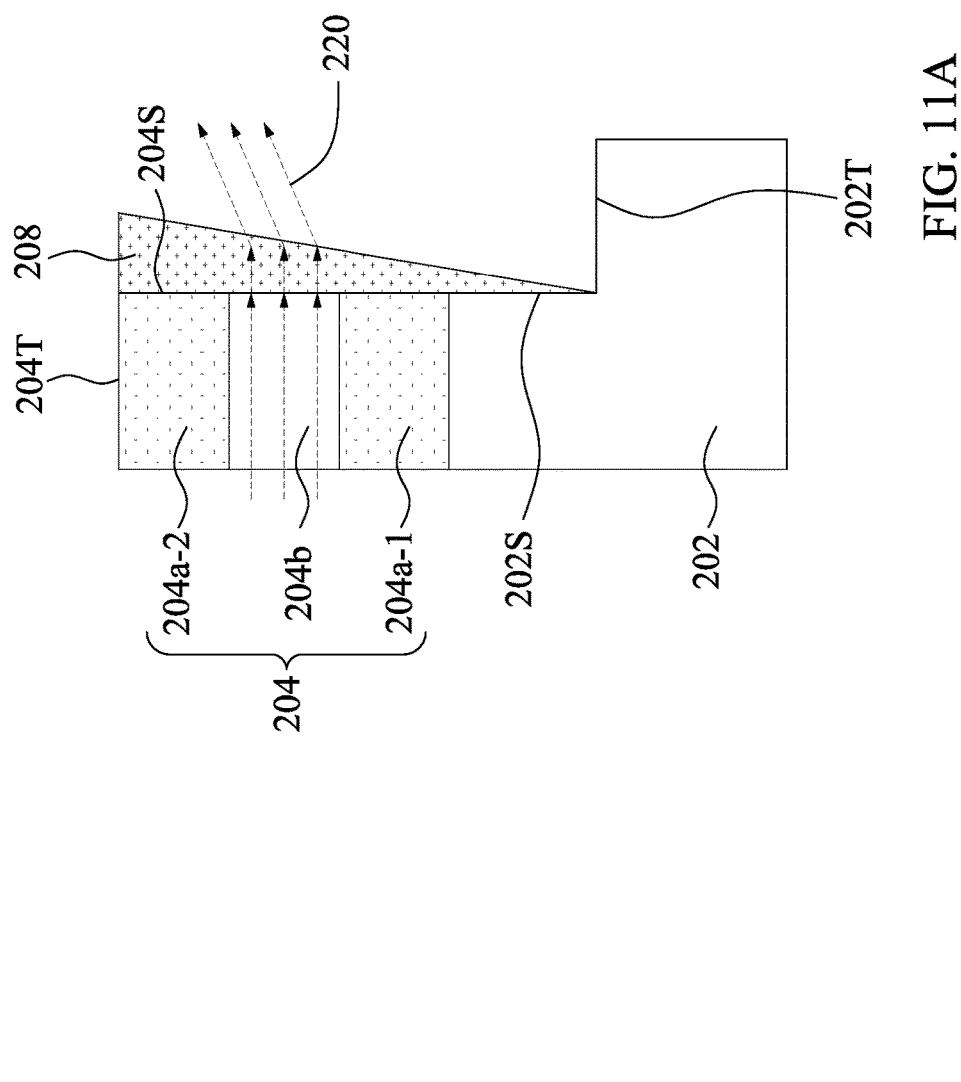

FIGS. 114 and 11B are schematic drawings respectively illustrating waveguide structures 200D and 200E according to aspects of the present disclosure in one or more embodiments. Referring to FIGS. 11A and 11B, in some embodiments, the ARC layer 208 may have an asymmetric profile with respect to a center axis of the stack structure 204, In some embodiments as shown in FIG. 11A, the thickness of the ARC layer 208 may decrease along the sidewall 204S of the stack structure 204 and the sidewall 202S of the substrate 202 from the top surface 204T of the stack structure 204 to the top surface 202T of the substrate 202. In some embodiments, the ARC layer 208 is configured to modulate a beam 220 of optical signals so as to propagate the beam 220 upwardly. In some embodiments as shown in FIG. 11B, the thickness of the ARC layer 208 may increase along the sidewall 204S of the stack structure 204 and the sidewall 202S of the substrate 202 from the top surface 204T of the stack structure 204 to the top surface 202T of the substrate 202. In some embodiments, the ARC layer 208 is configured to modulate a beam 220 of optical signals so as to propagate the beam 220 downwardly.

Figure 12:
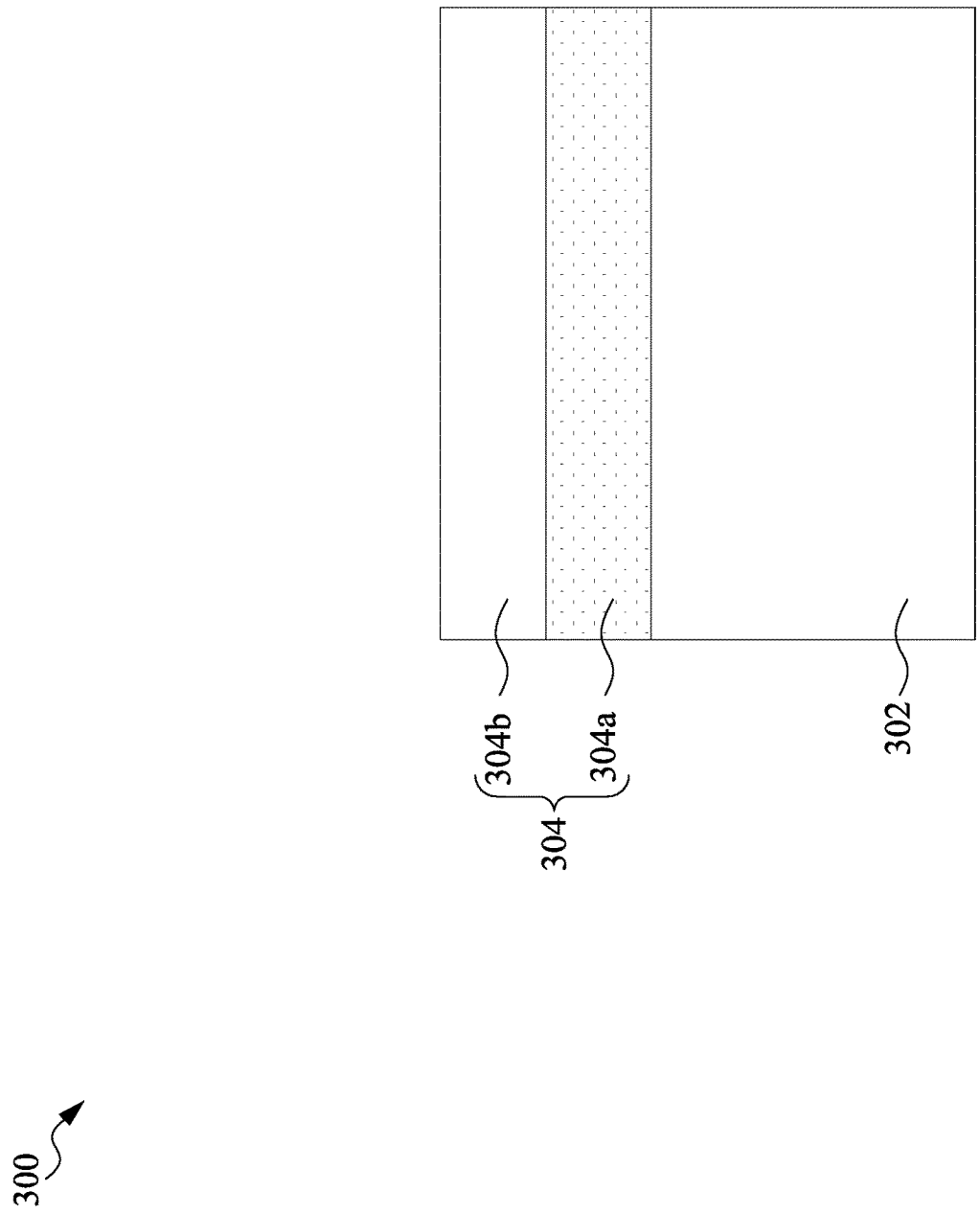
FIGS. 12-15 are schematic drawings illustrating a waveguide structure at various fabrication stages constructed according to aspects of the present disclosure in one or more embodiments.

FIGS. 12 to 15 are schematic drawings illustrating a waveguide structure 300 at various fabrication stages constructed according to aspects of the present disclosure in one or more embodiments. Referring to FIG. 12, a substrate 302 is provided or received. The respective step is shown as the operation 102 of the method 100 in FIG. 1. Alternatively or additionally, a stack structure 304 is formed over the substrate 302. The respective step is shown as the operation 104 of the method 100 in FIG. 1. The stack structure 304 includes layers 304a of a first composition alternating with layers 304b of a second composition. Although one layer 304a and one layer 204b are shown in FIG. 12, it should be understood that the stack structure 304 may include any number of layers of any suitable composition. The compositions of the layers in the stack structure 304 (e.g., the layers 304a and the layers 304b) may have different refractive indexes, dielectric constants, etchant sensitivities, and/or other differing properties. In some embodiments, a second refractive index of the layer 304b is greater than a first refractive index of the layer 304a. In some embodiments, the layer 304a is a dielectric layer, while the layer 304b is a semiconductor layer. In some embodiments, the layer 304a includes a buried oxide layer, while the layer 304b includes a silicon layer. The layer 304a, the layer 304b and the substrate 302 may together be referred to as an SOI substrate. In some embodiments, the layer 304b is configured as a core layer of the waveguide structure 300, while the layer 304a is configured as a cladding layer of the waveguide structure 300.

Figure 13:
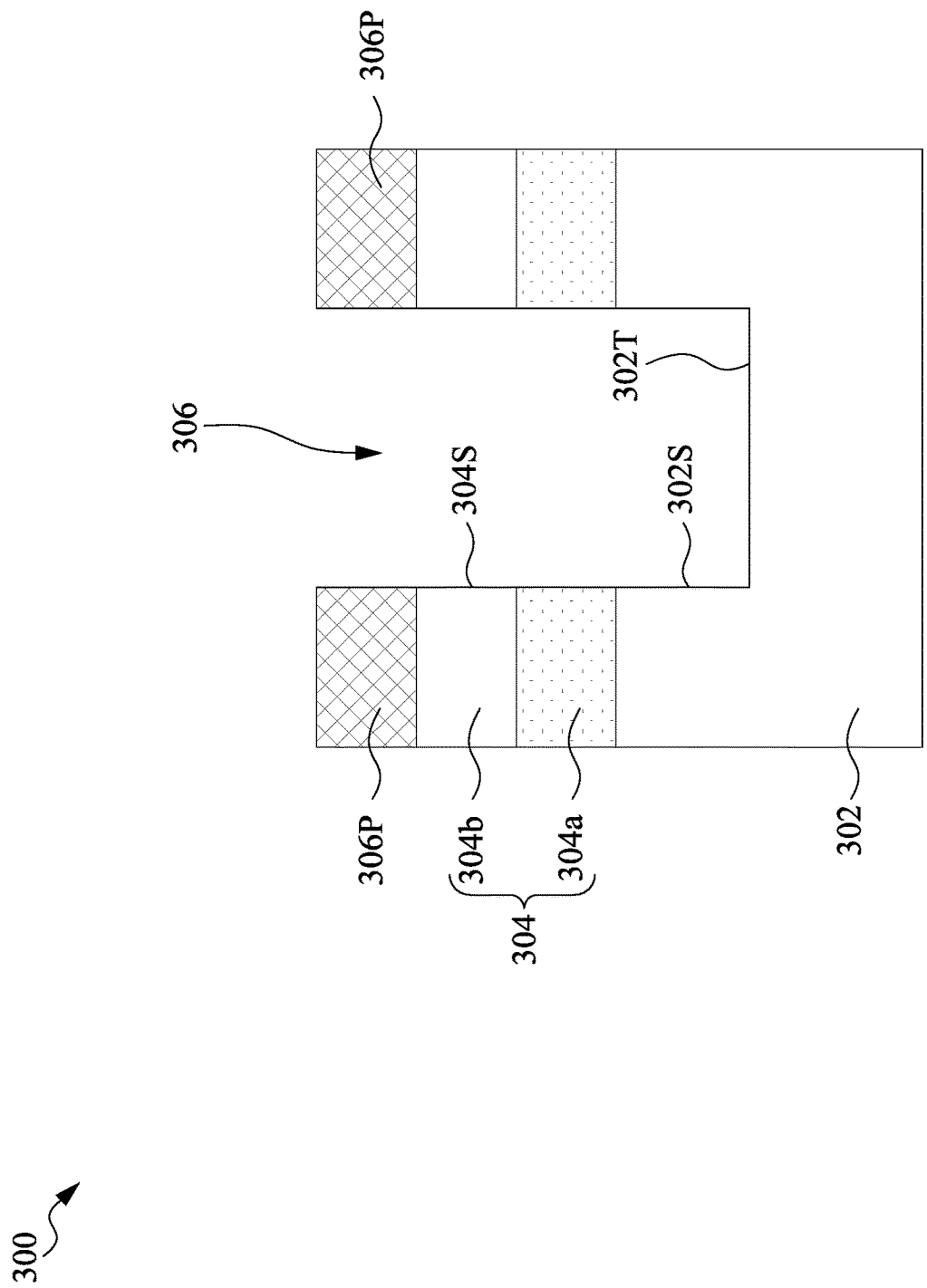

Referring to FIG. 13, a trench 306 is formed. The respective step is shown as the operation 106 of the method 100 in FIG. 1. In some embodiments, the trench 306 penetrates through the stack structure 304 and exposes the substrate 302. In some embodiments, a patterned protecting layer 306P is formed over the stack structure 304 for defining a location and a dimension of the trench 306. The patterned protecting layer 306P may be removed after the formation of the trench 306. In some embodiments, a surface 302T of the substrate 302 is exposed through the trench 306. Alternatively or additionally, a sidewall 302S of the substrate 302 may also be exposed through the trench 306.

Figure 14:
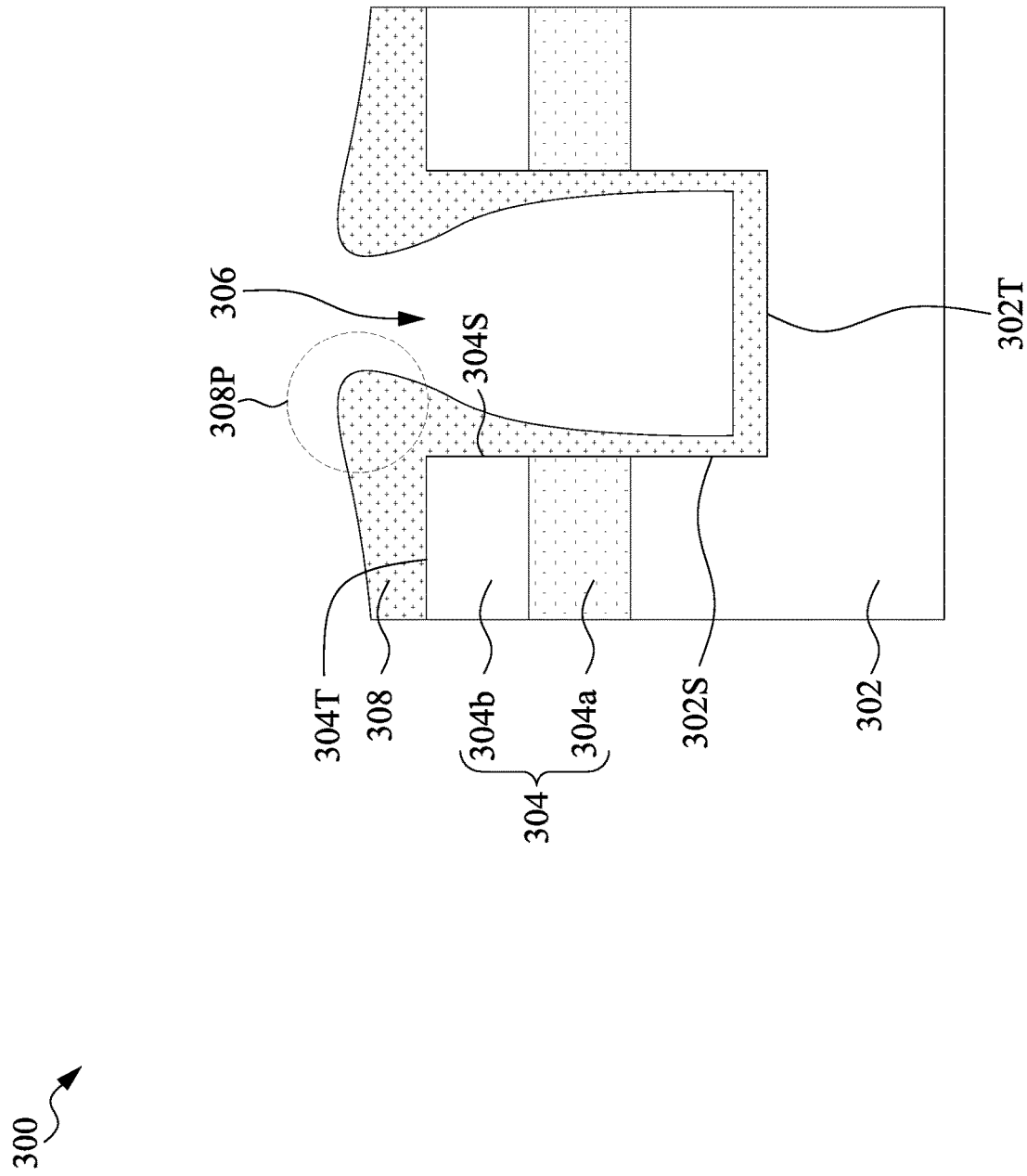

Referring to FIG. 14, an anti-reflection coating (ARC) layer 308 is deposited. The respective step is shown as the operation 108 of the method 100 in FIG. 1. In some embodiments, the ARC layer 308 covers the stack structure 304 and the exposed surface 302I of the substrate 302. Additionally, the ARC layer 308 may cover a top surface 304T of the stack structure 304 and sidewalls 304S of the stack structure 304. In some embodiments, the ARC layer 308 physically contacts the top surface 304I of the stack structure 304 and the sidewalls 304S of the stack structure 304. In some embodiments, a thickness of the ARC layer 308 on the sidewall 304S of the stack structure 304 may increase upwardly from a bottom of the trench 306 to the top surface 304T of the stack structure 304. In other words, the ARC layer 308 has an overhang profile. In some embodiments, the ARC layer 308 may be deposited over the stack structure 304 and the substrate 302 by a CVD operation, a PVD operation, an ALD operation or other suitable operations. In some embodiments, the second refractive index of the layer 304b is greater than a refractive index of the ARC layer 308. Additionally or alternatively, the refractive index of the ARC layer 308 is greater than a refractive index of the environment (e.g., air). In some embodiments, the refractive index of the ARC layer 308 is substantially in a range between 1 and 3.5. In some embodiments, the ARC layer 308 may be a single-layered structure. Alternatively, the ARC layer 308 may be a multi-layered structure.

Figure 15:
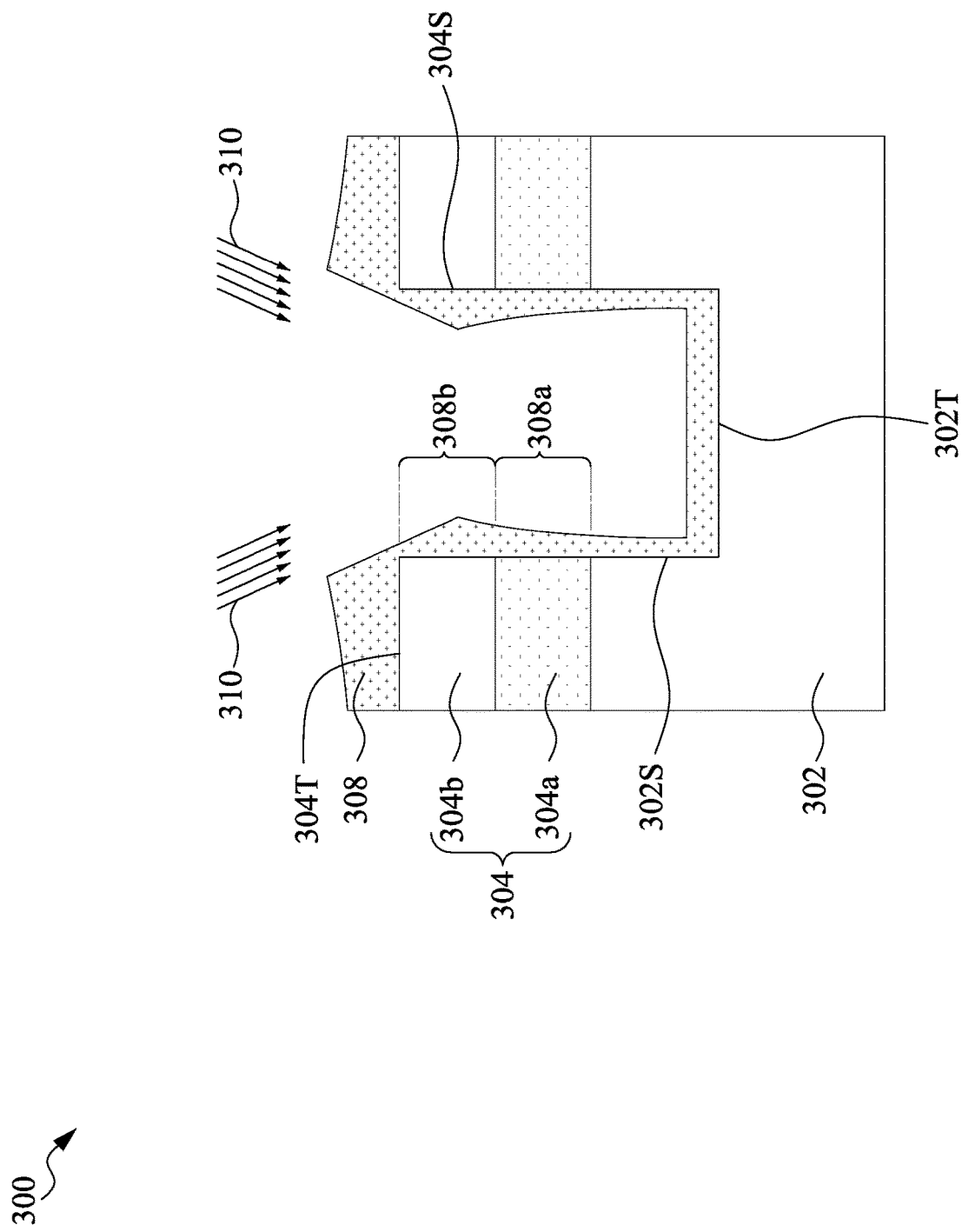

Referring to FIG. 15, one or more plasma operations 310 may be performed over the ARC layer 308. The respective step is shown as the operation 110 of the method 100 in FIG. 1. In some embodiments, at least a portion 308P of the ARC layer 308 is removed after the plasma operation 310. In some embodiments, the plasma operation 310 includes striking the portion 308P of the ARC layer 308 with a significant portion of charged particles, such as ions and/or electrons. In some embodiments, the plasma operation 310 also removes a portion of the ARC layer 308 over the top surface 302T of the substrate 302. Hence, a height of the ARC layer 308 over the top surface 302T of the substrate 302 may vary along the top surface 302T of the substrate 302. Alternatively or additionally, the height of the ARC layer 308 over the top surface 302T of the substrate 302 may be substantially uniform along the surface 302T of the substrate 302.

In some embodiments, the stack structure 304 remains substantially intact after the plasma operation 310. In some embodiments, the ARC layer 308 may continuously cover the top surface 304T and the sidewall 304S of the stack structure 304. Additionally, the ARC layer 308 may further continuously cover the sidewall 302S and the top surface 302T of the substrate 302. In some embodiments, a height of the ARC layer 308 varies along the top surface 304T of the stack structure 304. In other words, the height of the ARC layer 308 varies along a top surface of layer 304b. Alternatively, the ARC layer 308 is separated into two discrete portions (e.g., one portion over the top surface 304I of the stack structure 304, and another portion over the sidewall 304S of the stack structure 304), while the stack structure 304 remains substantially intact after the plasma operation 310.

In some embodiments, after the removal of the portion 308P of the ARC layer 308, a thickness of the ARC layer 308 varies along the sidewall 304S of the stack structure 304. In some embodiments, the ARC layer 308 has a widest portion 308b corresponding to the layer 304b. In some embodiments, a thickness of the portion 308b varies along a sidewall of the layer 304b. In some embodiments, the portion 308b is tapered toward the top surface 302T of the substrate 302 and the top surface 304T of the stack structure 304. Furthermore, the ARC layer 308 has a taper portion 308a corresponding to the layer 304a. In some embodiments, a thickness of the taper portion 308a corresponding to the layer 304a decreases from the widest portion 308b to the top surface 302T of the substrate 302. In some embodiments, the ARC layer 308 has an asymmetric profile. Alternatively, the ARC layer 308 has a symmetric profile after the plasma operation 310.

The thickness of the ARC layer 308 may be related to the wavelength of the transmitted optical signal. Owing to a thickness variation of the ARC layer 308 along the sidewall of the layer 304b (i.e., the core layer), a broadband wavelength of optical signals may be transmitted through the ARC layer 308. In some embodiments, the wavelength of the optical signals is substantially in a range between 1300 nanometers and 1800 nanometers. The thickness of the ARC layer 308 may be selected such that the broadband wavelength of the optical signals may be transmitted or collected through the ARC layer 308. In some embodiments, the thickness of the ARC layer 308 is substantially in a range between 150 nanometers and 250 nanometers.

In some embodiments, a sawing operation (or a dicing operation) is performed. In some embodiments, the substrate 302 is cut into individual components to form the waveguide structure 300. Accordingly, the waveguide structure 300 (sometimes referred to as an edge coupler) including the layers 304a, 304b and the ARC layer 308 is formed.

Figure 16:
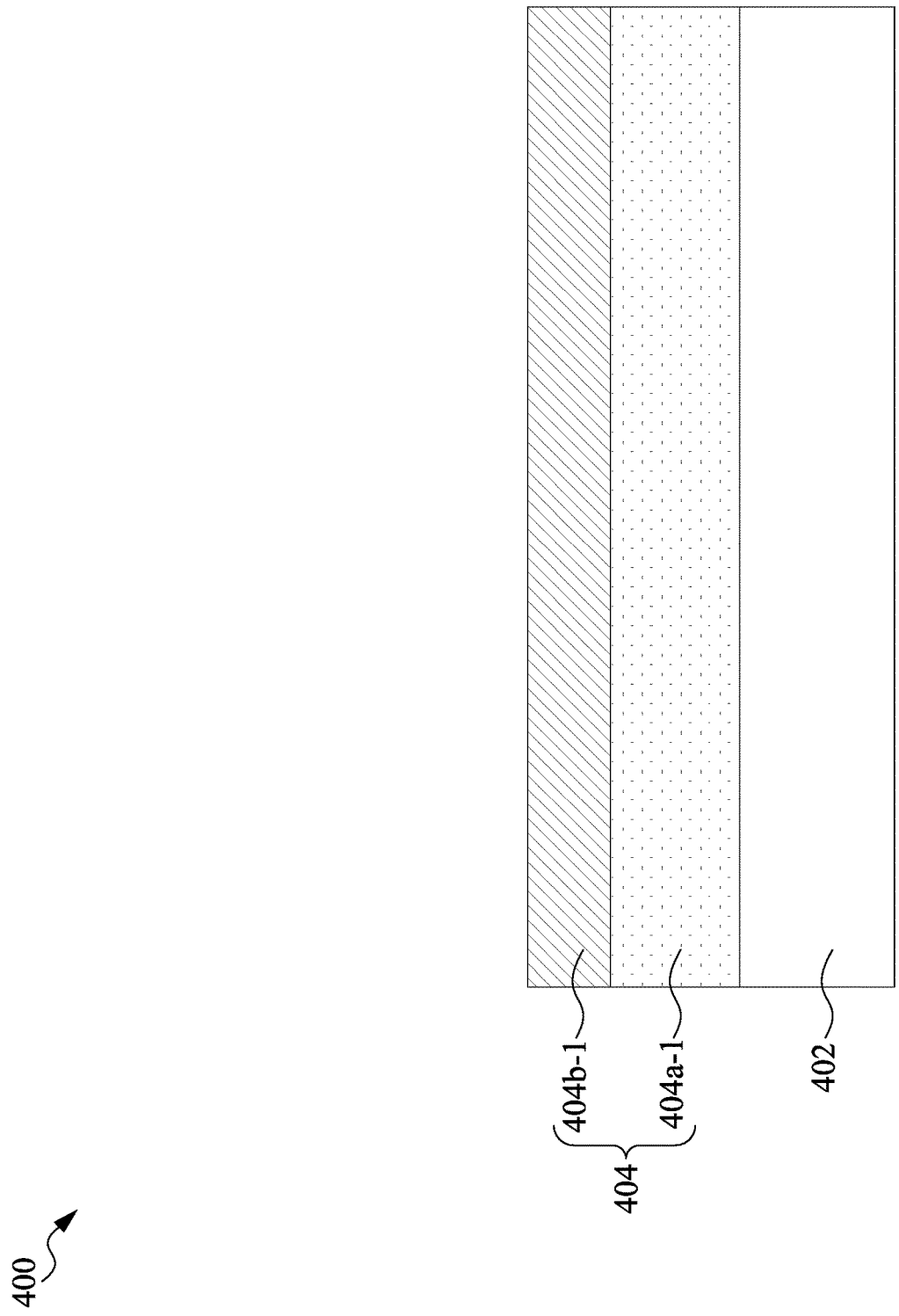
FIGS. 16-24 are schematic drawings illustrating a waveguide structure at various fabrication stages constructed according to aspects of the present disclosure in one or more embodiments.

FIGS. 16 to 24 are schematic drawings illustrating a waveguide structure 400 at various fabrication stages constructed according to aspects of the present disclosure in one or more embodiments. Referring to FIG. 16, a substrate 402 is provided or received. The respective step is shown as the operation 102 of the method 100 in FIG. 1.

Referring to FIGS. 16 to 21, a stack structure 404 is formed over the substrate 402. The respective step is shown as the operation 104 of the method 100 in FIG. 1. The stack structure 404 may include alternating layers of different compositions. For example, the stack structure 404 includes layers 404a of a first composition alternating with layers 404b of a second composition. The stack structure 304 may include any number of layers of any suitable composition. The compositions of the layers in the stack structure 404 (e.g., the layers 404a and the layers 404b) may have different refractive indexes, dielectric constants, etchant sensitivities, and/or other differing properties. In some embodiments, a second refractive index of the layer 404b is greater than a first refractive index of the layer 404a, In some embodiments, both layers 404a and 404b are dielectric layers. In some embodiments, a second dielectric constant of the layer 404b is greater than a first dielectric constant of the layer 404a.

Figure 17:
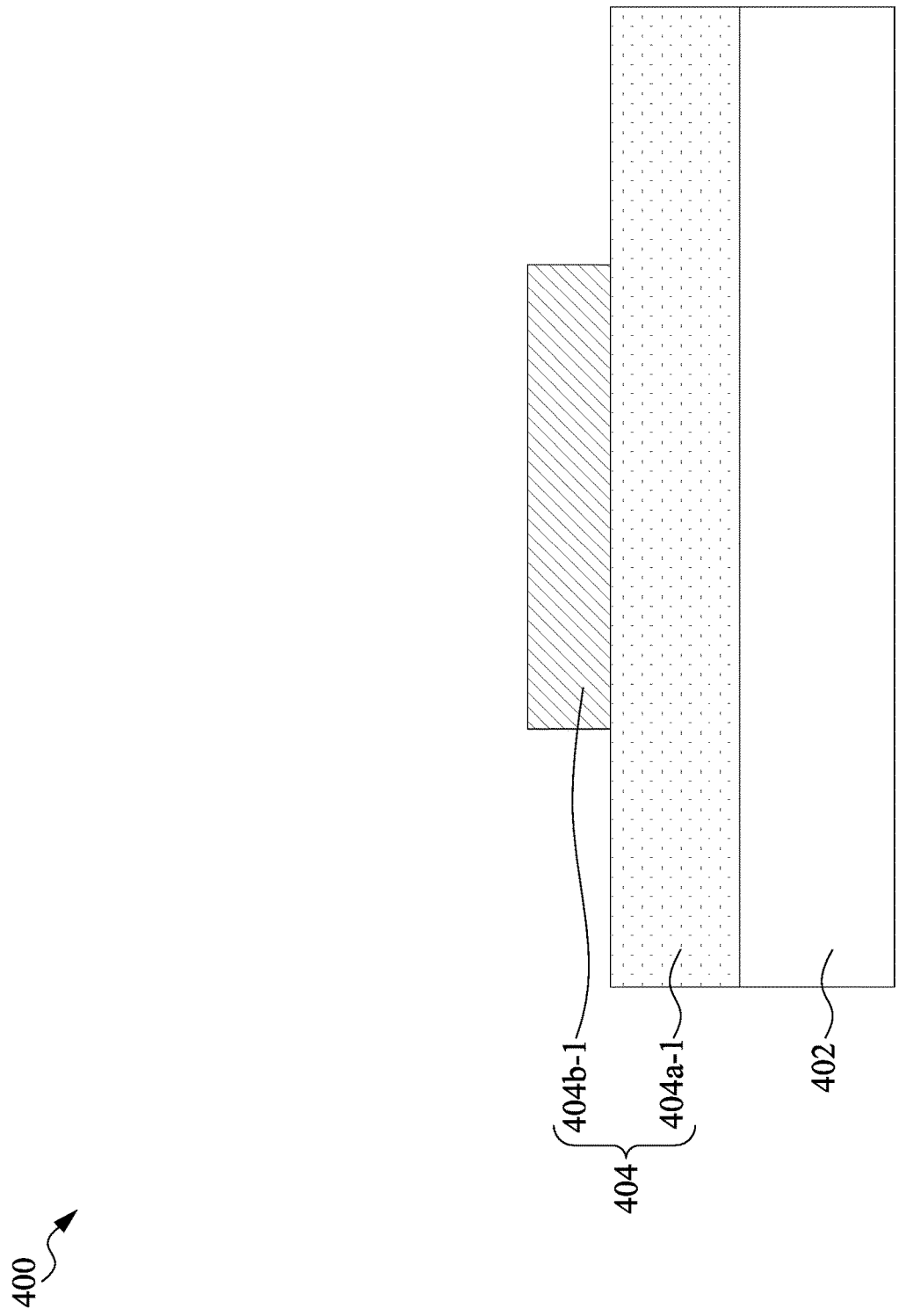
Figure 18:
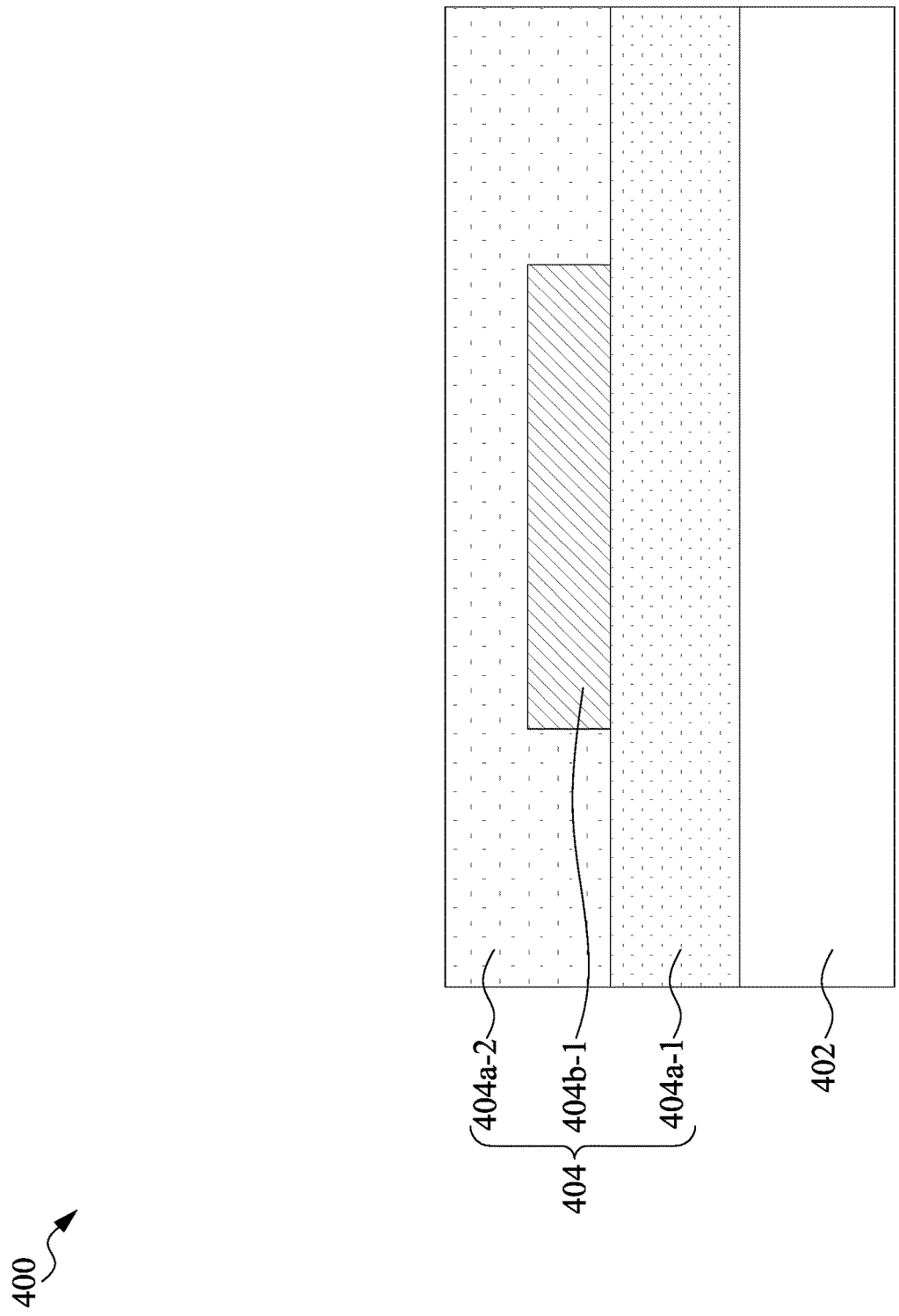
Figure 19:
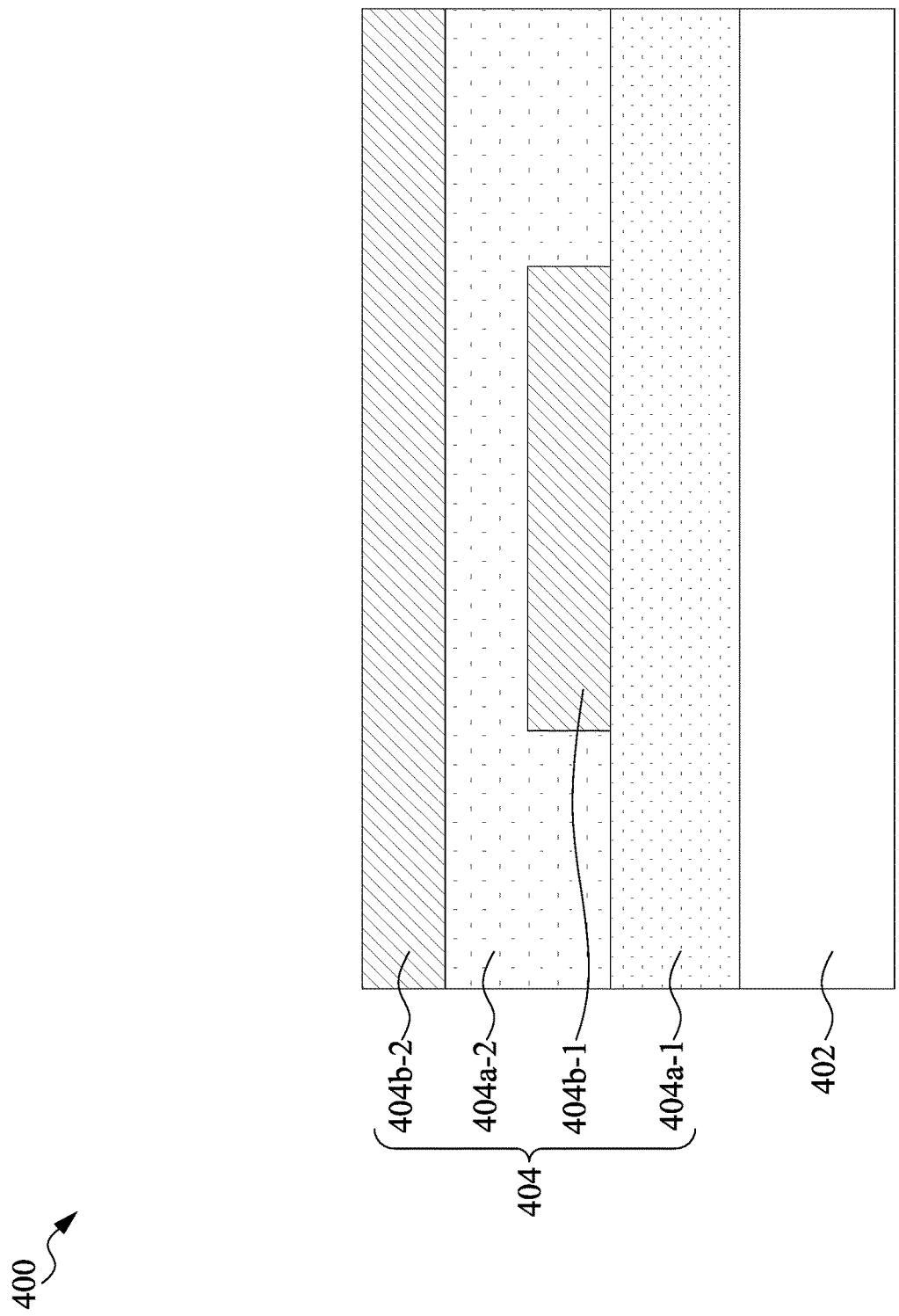
Figure 20:
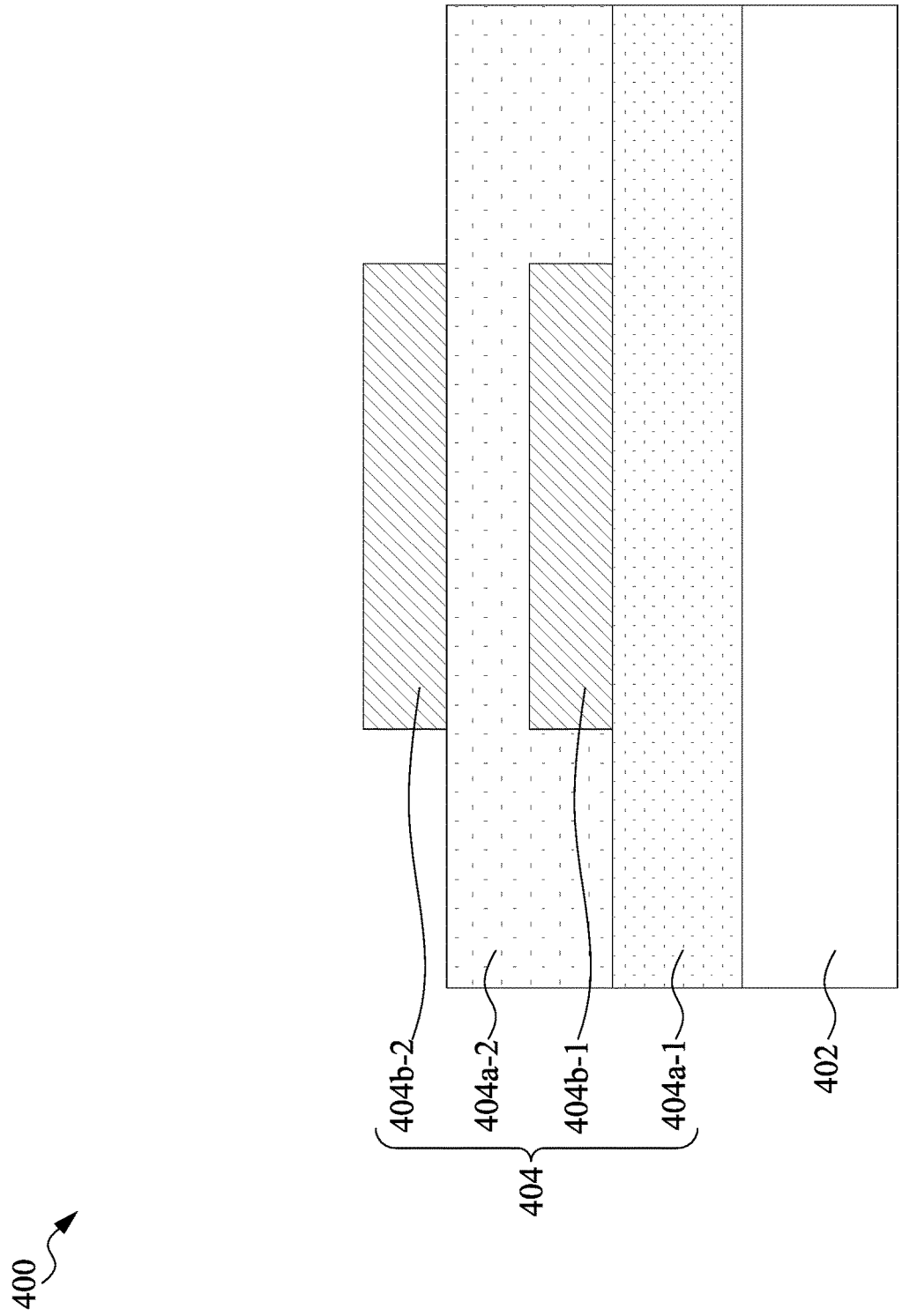
Figure 21:
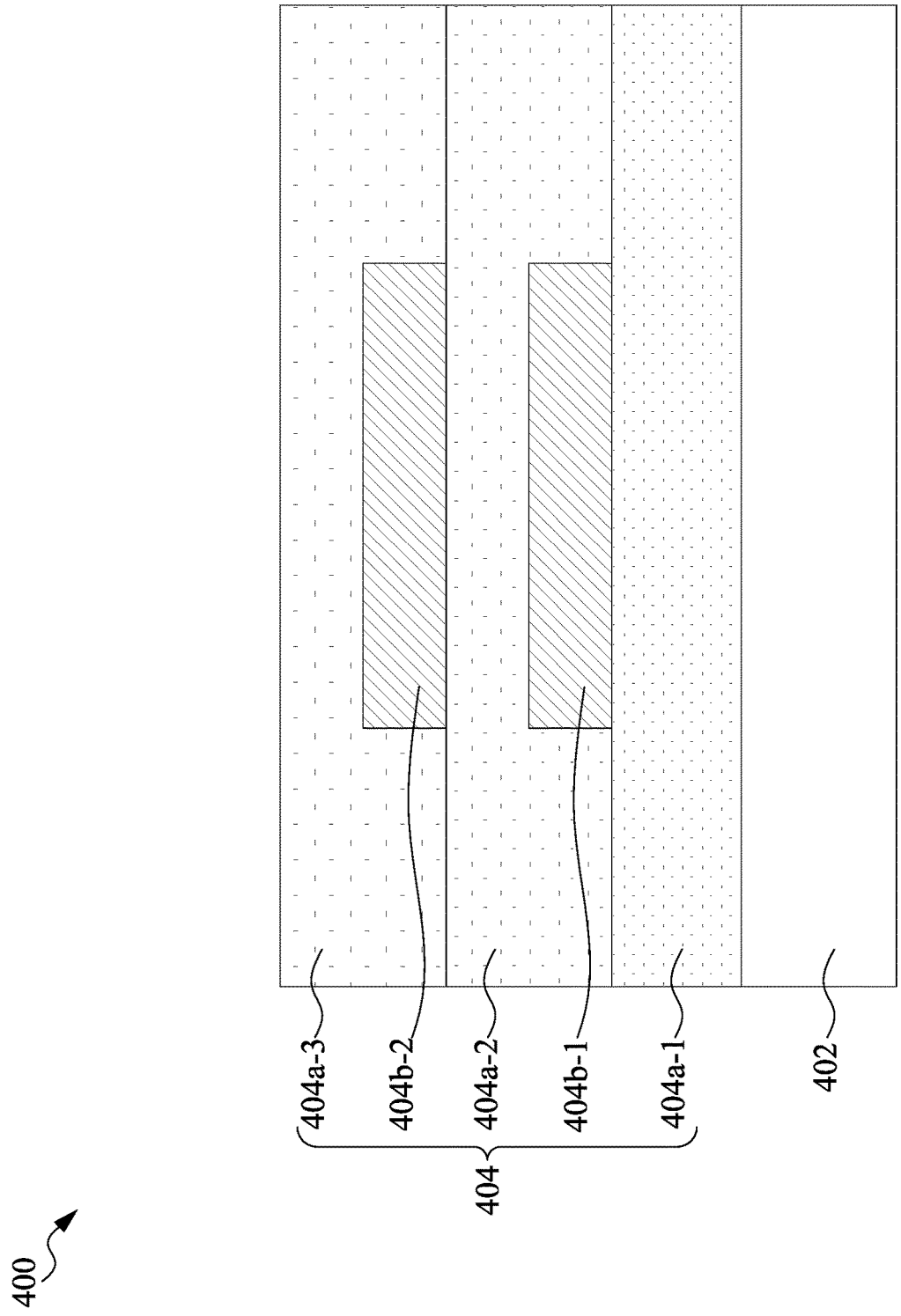

The formation of the stack structure 404 may include multiple operations. Referring to FIG. 16, a layer 404a-1 and a layer 404b-1 are sequentially deposited over the substrate 402. Referring to FIG. 17, the layer 404b-1 is patterned. In some embodiments, a patterned protecting layer (not shown) is formed over the layer 404b-1 for defining a location and a dimension of the layer 404b-1. After the layer 404b-1 is patterned, the patterned protecting layer may be removed. Referring to FIG. 18, a layer 404a-2 is deposited over the substrate 402. The layer 404a-2 may cover a top surface and sidewalls of the layer 404b-1. Referring to FIGS. 19 to 20, operations similar to those illustrated in FIGS. 16 to 17 may be performed to form a patterned layer 404b-2. Referring to FIG. 21, a layer 404a-3 is deposited over the substrate 402. The layer 404a-3 may cover a top surface and sidewalls of the layer 404b-2. In some embodiments, the layers 404b-1 and 404b-2 are configured as core layers of the waveguide structure 400, while the layers 404a-1, 404a-2 and 404a-3 are configured as cladding layers of the waveguide structure 400.

Figure 22:
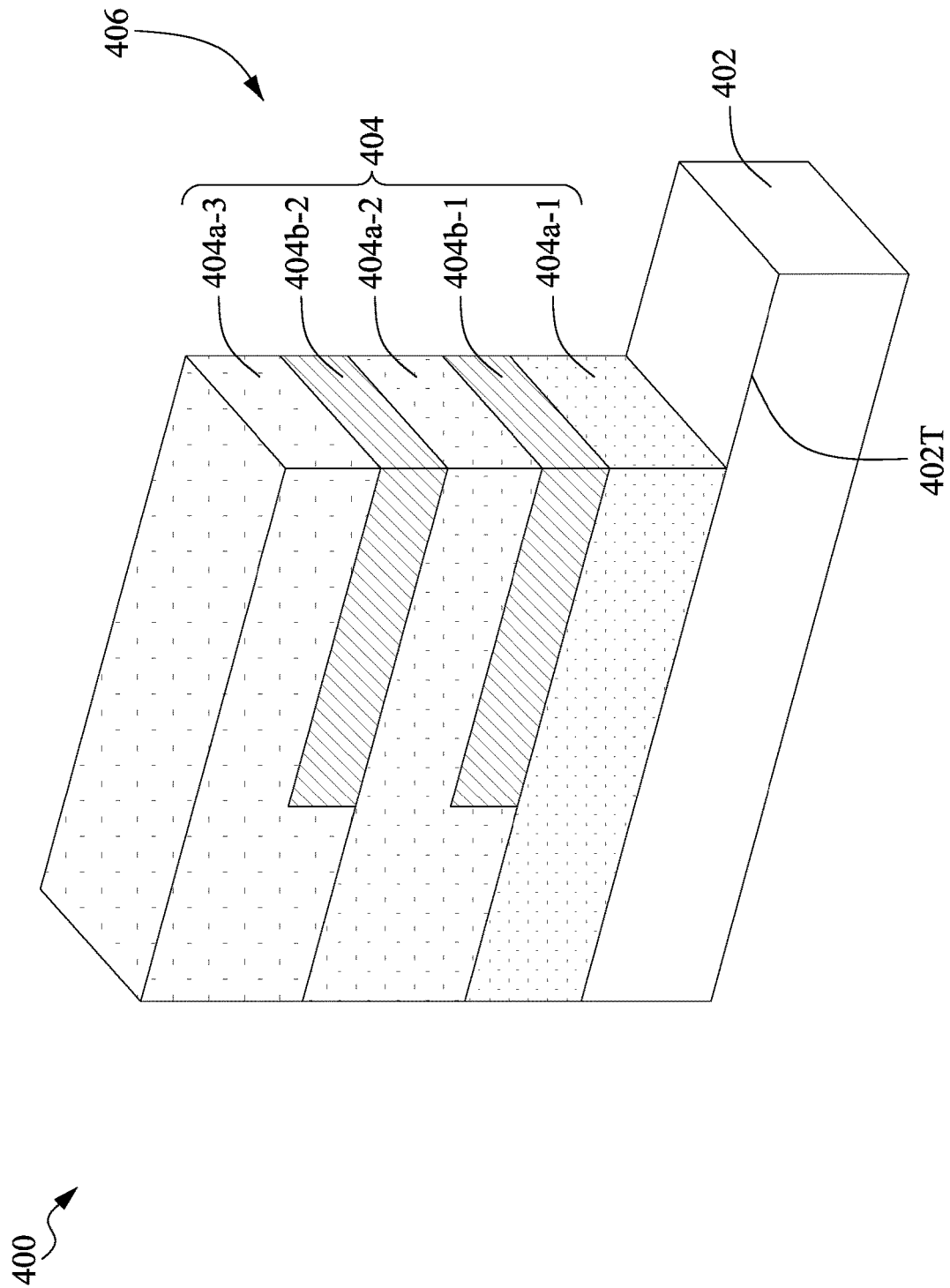

Referring to FIG. 22, a trench 406 is formed. The respective step is shown as the operation 106 of the method 100 in FIG. 1, In some embodiments, the trench 406 penetrates through the stack structure 404 and exposes the substrate 402. In some embodiments, a surface 402T of the substrate 402 is exposed through the trench 406.

Figure 23:
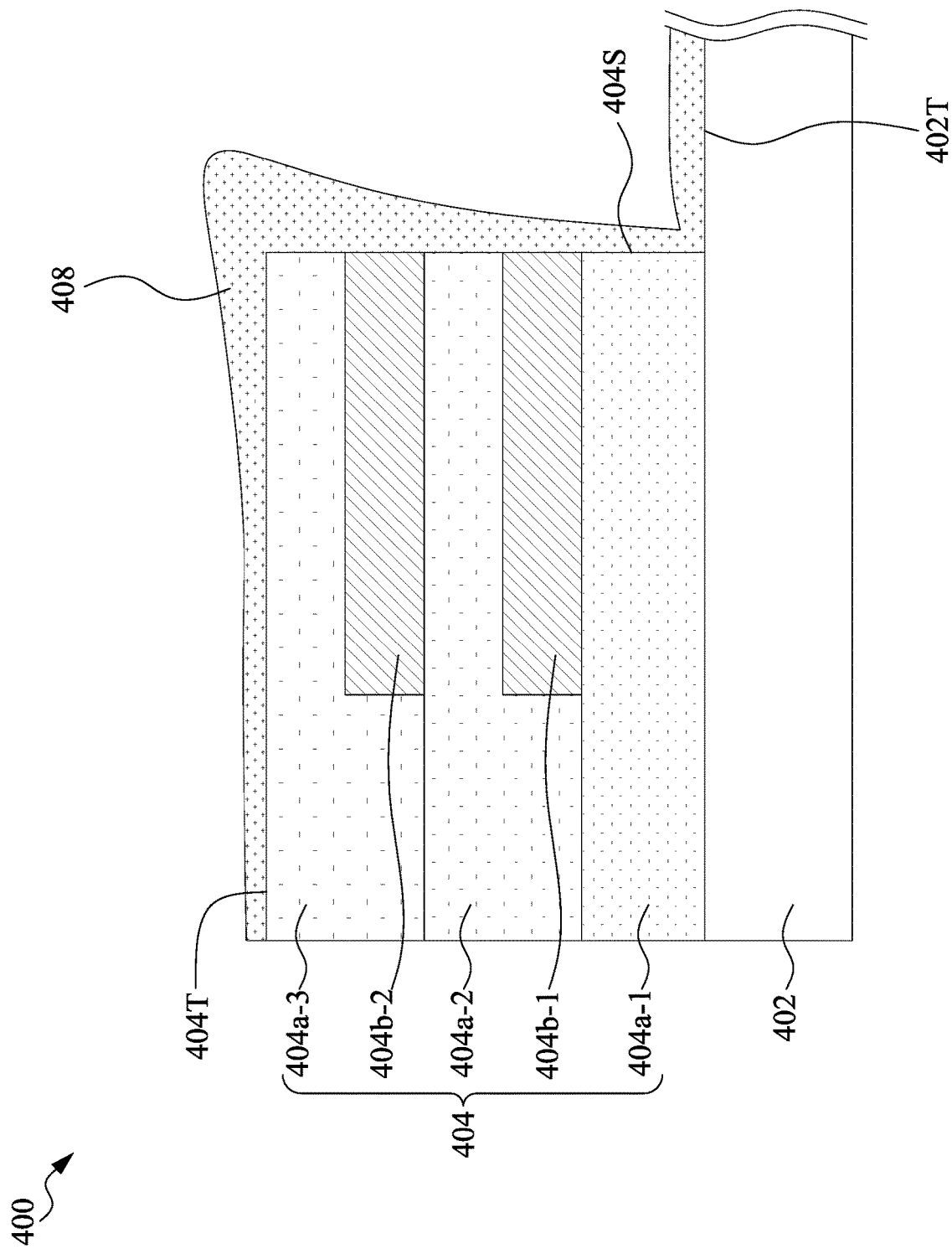

Referring to FIG. 23, an anti-reflection coating (ARC) layer 408 is deposited. The respective step is shown as the operation 108 of the method 100 in FIG. 1. In some embodiments, the ARC layer 408 covers the stack structure 404 and the exposed surface 402T of the substrate 402. Additionally, the ARC layer 408 may cover a top surface 404T of the stack structure 404. In some embodiments, the ARC layer 408 physically contacts the top surface 404T of the stack structure 404 and sidewalls 404S of the stack structure 404. In some embodiments, a thickness of the ARC layer 408 on the sidewall 404S of the stack structure 404 may increase upwardly from the top surface 402T of the substrate 402 to the top surface 404I of the stack structure 404. In other words, the ARC layer 408 has an overhang profile. In some embodiments, the ARC layer 408 may be deposited over the stack structure 404 and the substrate 402 by a CAI) operation, a PVD operation, an ALD operation or other suitable operations. In some embodiments, the second refractive index of the layers 404b-1 and 404b-2 is greater than a refractive index of the ARC layer 408. Additionally or alternatively, the refractive index of the ARC layer 408 is greater than a refractive index of the environment (e.g., air).

Figure 24:
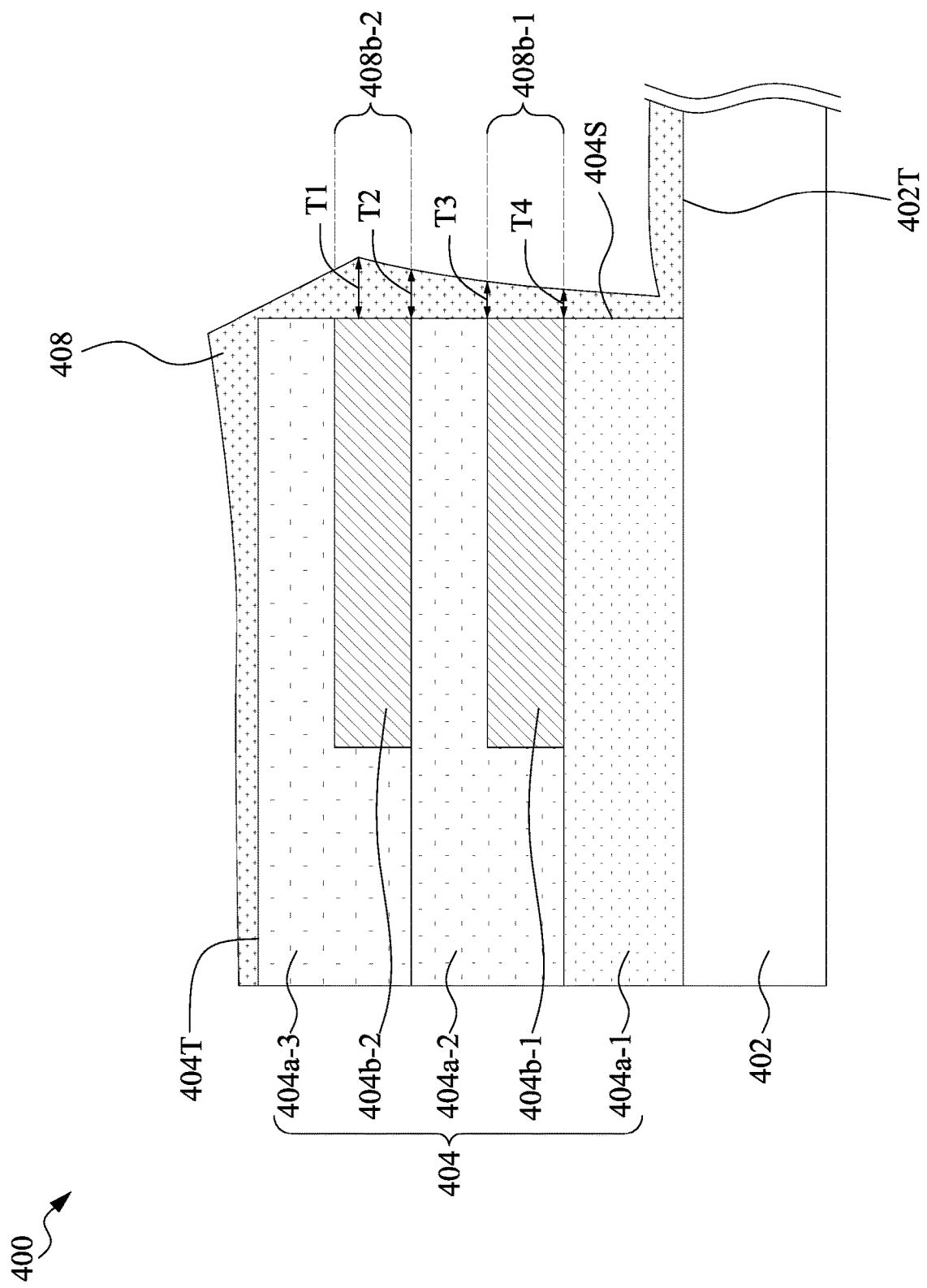

Referring to FIG. 24, one or more plasma operations may be performed over the ARC layer 408. The respective step is shown as the operation 110 of the method 100 in FIG. 1. In some embodiments, at least a portion of the ARC layer 408 is removed after the plasma operation. Alternatively or additionally, the plasma operation also removes a portion of the ARC layer 408 over the top surface 402T of the substrate 402. In some embodiments, the stack structure 404 remains substantially intact after the plasma operation. In some embodiments, the ARC layer 408 may continuously cover the top surface 404I and the sidewall 404S of the stack structure 404. Additionally, the ARC layer 408 may further continuously cover the top surface 402T of the substrate 402. Alternatively, the ARC layer 408 is separated into two discrete portions (e.g., one portion over the top surface 404T of the stack structure 404, and another portion over the sidewall 404S of the stack structure 404), while the stack structure 404 remains substantially intact after the plasma operation.

In some embodiments, a thickness of the ARC layer 408 varies along the sidewall 404S of the stack structure 404. In some embodiments, the ARC layer 408 has a portion 408b-1 corresponding to the layer 404b-1, and a portion 408b-2 corresponding to the layer 404b-2. In some embodiments, the portion 408b-2 has a top thickness T1 and a bottom thickness T2, while the portion 408b-1 has a top thickness T3 and a bottom thickness T4. In some embodiments, the thickness T1 is greater than the thickness T2 the thickness T2 is greater than the thickness T3, and the thickness T3 is greater than the thickness T4. The thicknesses T1, T2, T3 and T4 of the ARC layer 408 may be selected such that a broadband wavelength of optical signals may be transmitted or collected through the ARC layer 408. In some embodiments, the thicknesses T1, T2, T3 and T4 of the ARC layer 408 are substantially in a range between 150 nanometers and 250 nanometers. The presence of the portions 408b-1 and 408b-2 lining the respective layers 404b-1 and 404b-2 may help to collect a broader band of optical signals. Accordingly, light coupling properties, including coupling efficiency, bandwidth, and/or alignment tolerance may be improved.

Figure 25:
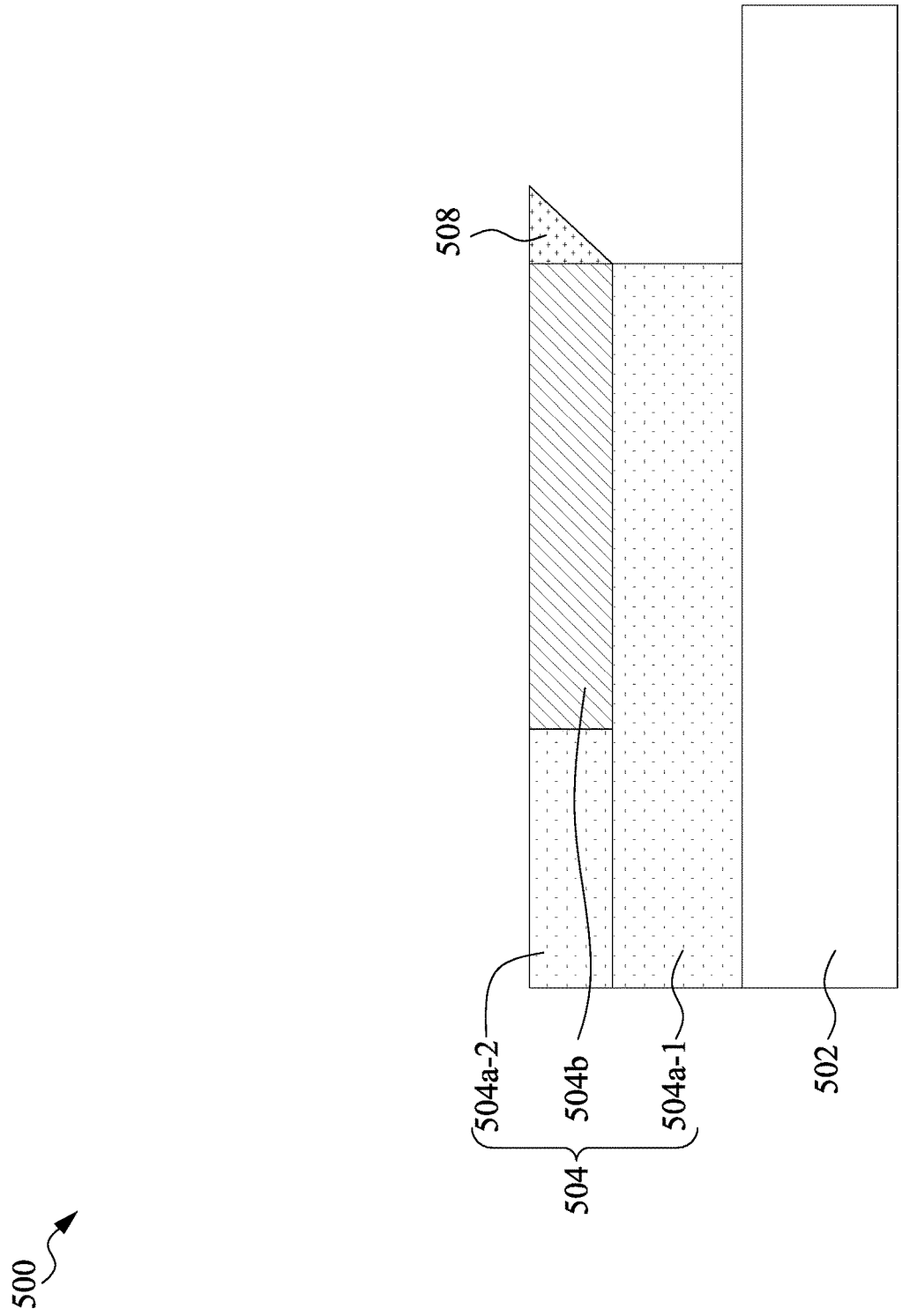
FIGS. 25-28 are schematic drawings illustrating a waveguide structure at various fabrication stages constructed according to aspects of the present disclosure in one or more embodiments.

In some embodiments, a sawing operation (or a dicing operation) is performed. In some embodiments, the substrate 402 is cut into individual components to form the waveguide structure 400. Accordingly, the waveguide structure 400 (sometimes referred to as an edge coupler) including the layers 404a, 404b and the ARC layer 408 is formed, FIGS. 25 to 28 are schematic drawings illustrating a waveguide structure 500 at various fabrication stages constructed according to aspects of the present disclosure in one or more embodiments. Referring to FIG. 25, a substrate 502 is provided or received. In some embodiments, a stack structure 504 is formed over the substrate 502. The stack structure 504 includes layers 504a (e.g., the layers 504a-1 and 504a-2) having a first composition and a layer 504b having a second composition. The compositions of the layers in the stack structure 504 (e.g., the layers 504a and the layer 504b) may have different refractive indexes, dielectric constants, and/or other differing properties. In some embodiments, a second refractive index of the layer 504b is greater than a first refractive index of the layers 504a. In some embodiments, both layers 504a and 504b are dielectric layers. In some embodiments, a second dielectric constant of the layer 504b is greater than a first dielectric constant of the layers 504a, In some embodiments, an ARC layer 508 is formed on a sidewall of the stack structure 504. In some embodiments, the ARC layer 508 is formed by deposition operations followed by plasma operations or etch-back operations. In some embodiments, a thickness of the ARC layer 508 varies along the sidewall of the layer 504b. In some embodiments, the ARC layer 508 covers only a sidewall of the layer 504b. In other words, a sidewall of the layer 504a-1 is substantially free of the ARC layer 508.

Figure 26:
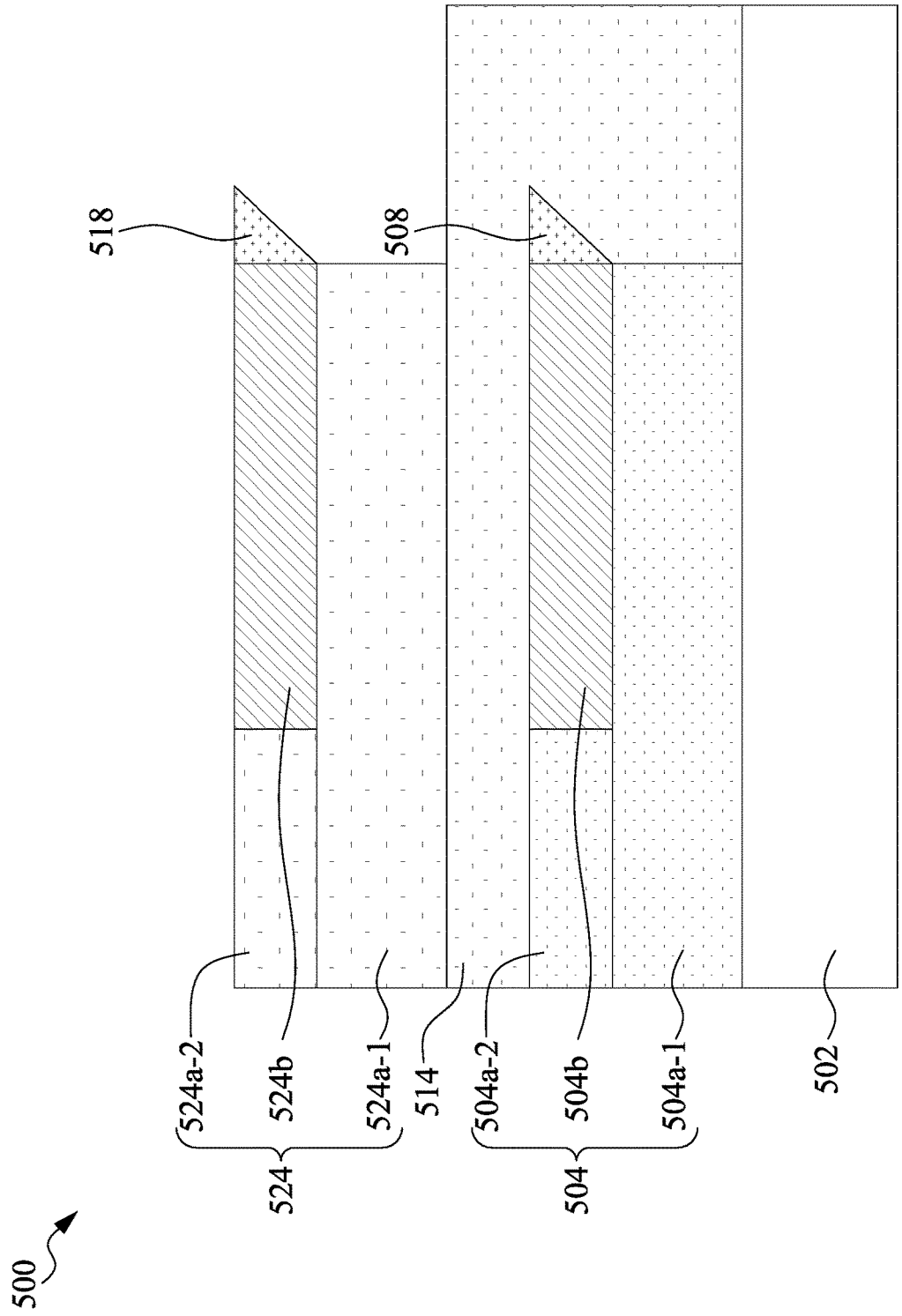

Referring to FIG. 26, a dielectric layer 514 is formed over the stack structure 504. In some embodiments, another stack structure 524 is formed over the dielectric layer 514. The stack structure 524 includes layers 524a (e.g., the layers 524a-1 and 524a-2) having a first composition and a layer 524b having a second composition. The compositions of the layers in the stack structure 524 (e.g., the layers 524a and the layer 524b) may have different refractive indexes, dielectric constants, and/or other differing properties. In some embodiments, a second refractive index of the layer 524b is greater than a first refractive index of the layers 524a. In some embodiments, both layers 524a and 524b are dielectric layers. In some embodiments, a second dielectric constant of the layer 524b is greater than a first dielectric constant of the layers 524a, In some embodiments, a composition of the dielectric layer 514 is same as the composition of the layers 524a. In some embodiments, another ARC layer 518 is formed on a sidewall of the stack structure 524. In some embodiments, the ARC layer 518 is formed by deposition operations followed by plasma operations or etch-back operations. In some embodiments, a thickness of the ARC layer 518 varies along a sidewall of the layer 524b. In some embodiments, the ARC layer 518 covers only the sidewall of the layer 524b. In other words, a sidewall of the layer 524a-1 is substantially free of the ARC layer 518. In some embodiments, a thickness profile of the ARC layer 518 is substantially same as that of the ARC layer 508. Alternatively, the thickness profile of the ARC layer 518 is different from that of the ARC layer 508.

Figure 27:
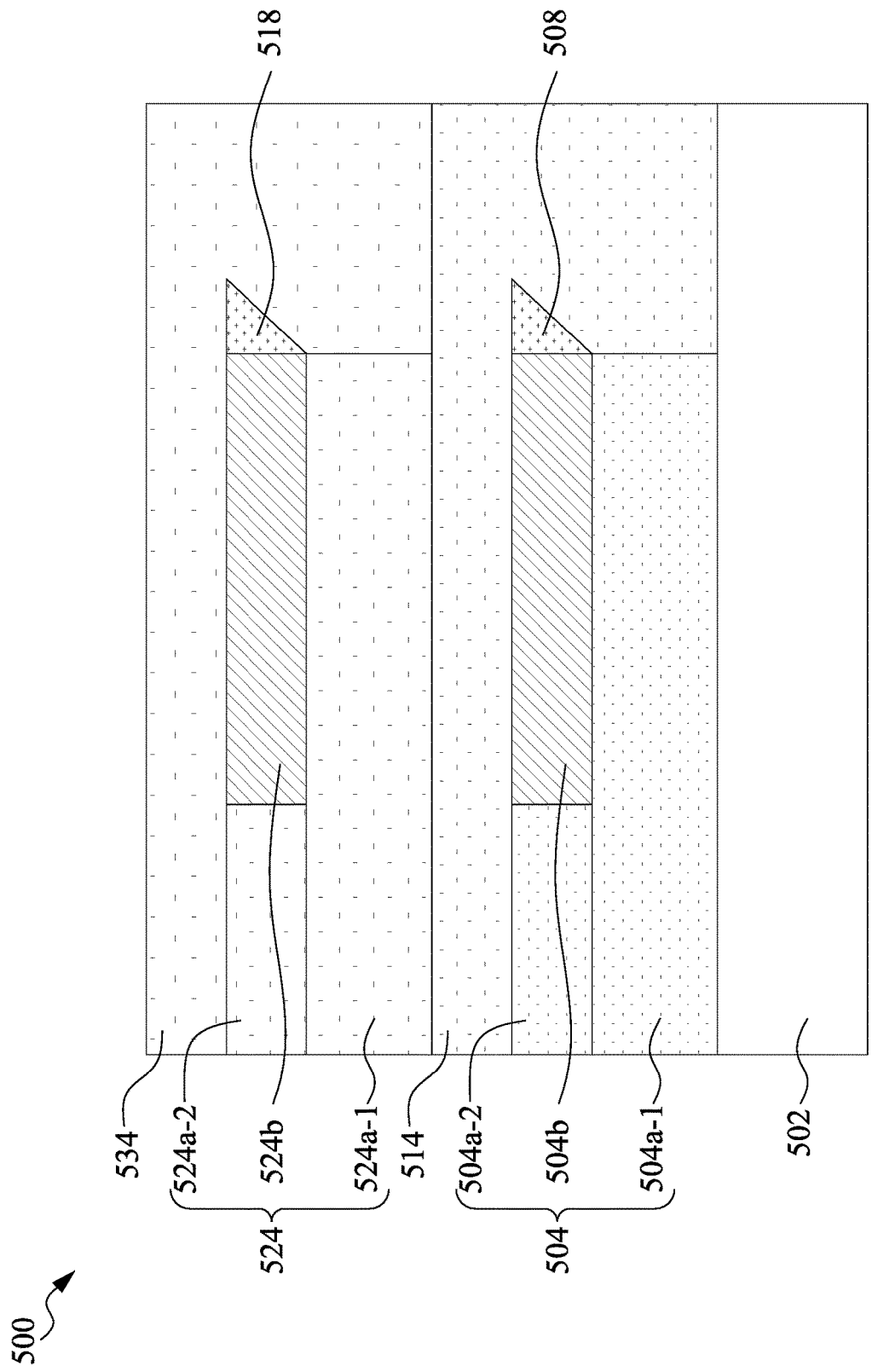
Figure 28:
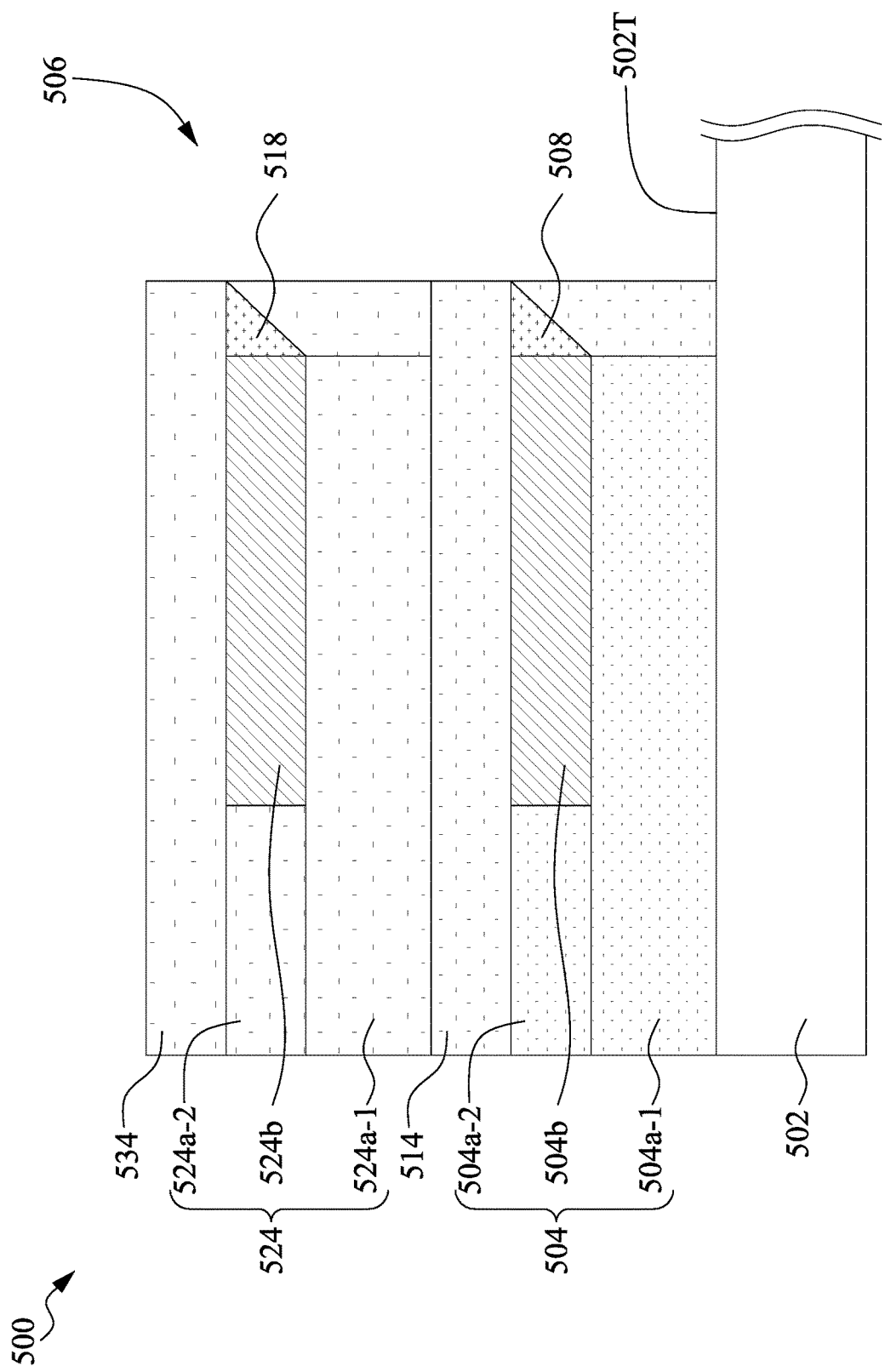

Referring to FIG. 27, a dielectric layer 534 is formed over the stack structure 524, In some embodiments, a composition of the dielectric layer 534 is same as the composition of the layers 524a. Referring to FIG. 28, a trench 506 is formed. In some embodiments, the trench 506 penetrates through the dielectric layers 514 and 534, and exposes the substrate 502. In some embodiments, a surface 502T of the substrate 502 is exposed through the trench 506. Alternatively or additionally, a surface of the ARC layer 508 or a surface of the ARC layer 518 is exposed through the trench 506.

Figure 29:
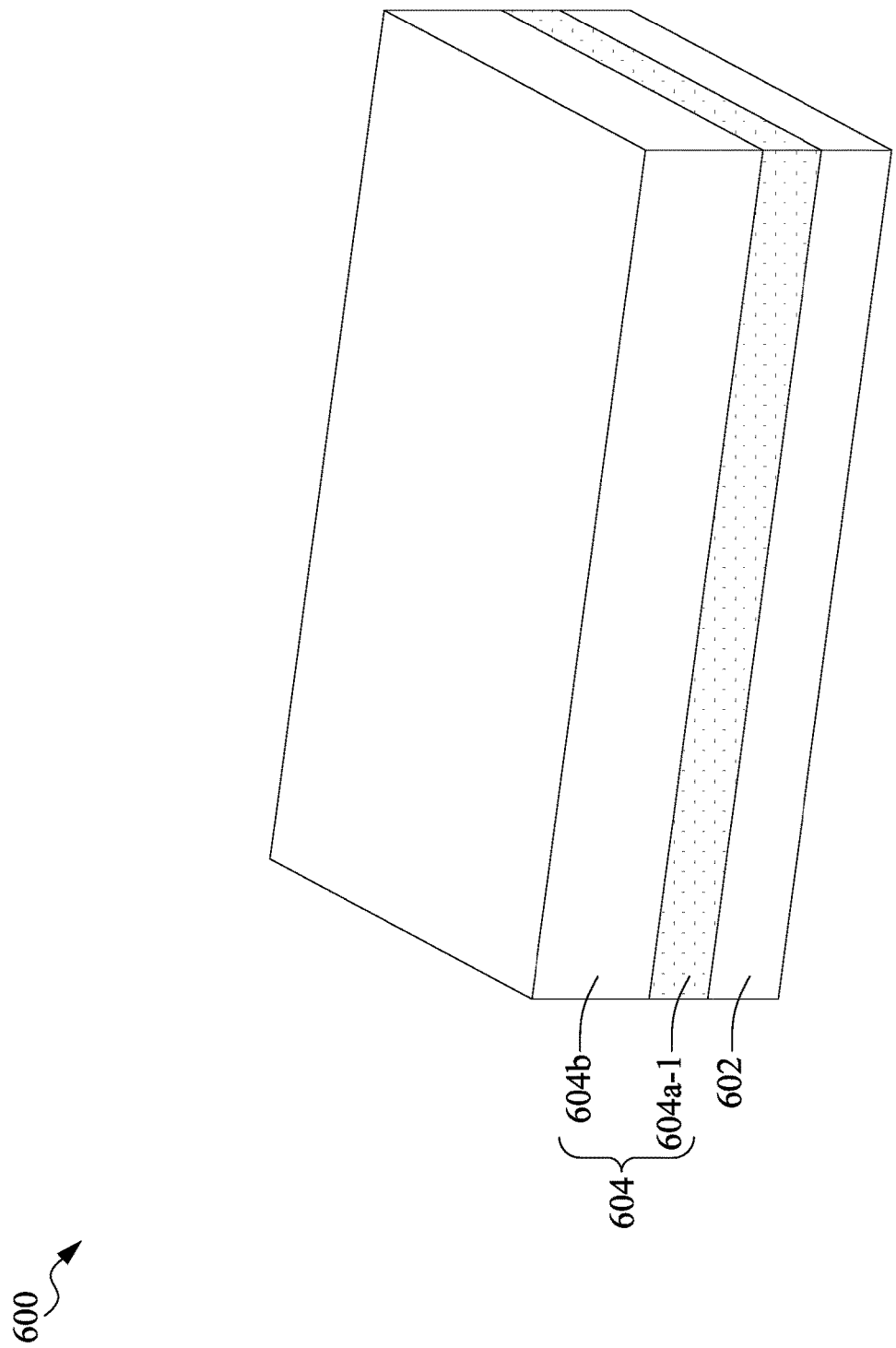
FIGS. 29-32 are schematic drawings illustrating a waveguide structure 600 at various fabrication stages constructed according to aspects of the present disclosure in one or more embodiments.

FIGS. 29 to 32 are schematic drawings illustrating a waveguide structure 600 at various fabrication stages constructed according to aspects of the present disclosure in one or more embodiments. Referring to FIG. 29, a substrate 602 is provided or received. Alternatively or additionally, a stack structure 604 is formed over the substrate 602. The stack structure 604 includes layers 604a (including layers 604a-1 and 604a-2) having a first composition and layer 604b having a second composition. The compositions of the layers in the stack structure 604 (e.g., the layers 604a and the layer 604b) may have different refractive indexes, dielectric constants, etchant sensitivities, and/or other differing properties. In some embodiments, a second refractive index of the layer 604b is greater than a first refractive index of the layers 604a. In some embodiments, the layer 604a is a dielectric layer, while the layer 604b is a semiconductor layer. In some embodiments, both layers 604a and 604b are dielectric layers. In some embodiments, a second dielectric constant of the layer 604b is greater than a first dielectric constant of the layers 604a.

Figure 30:
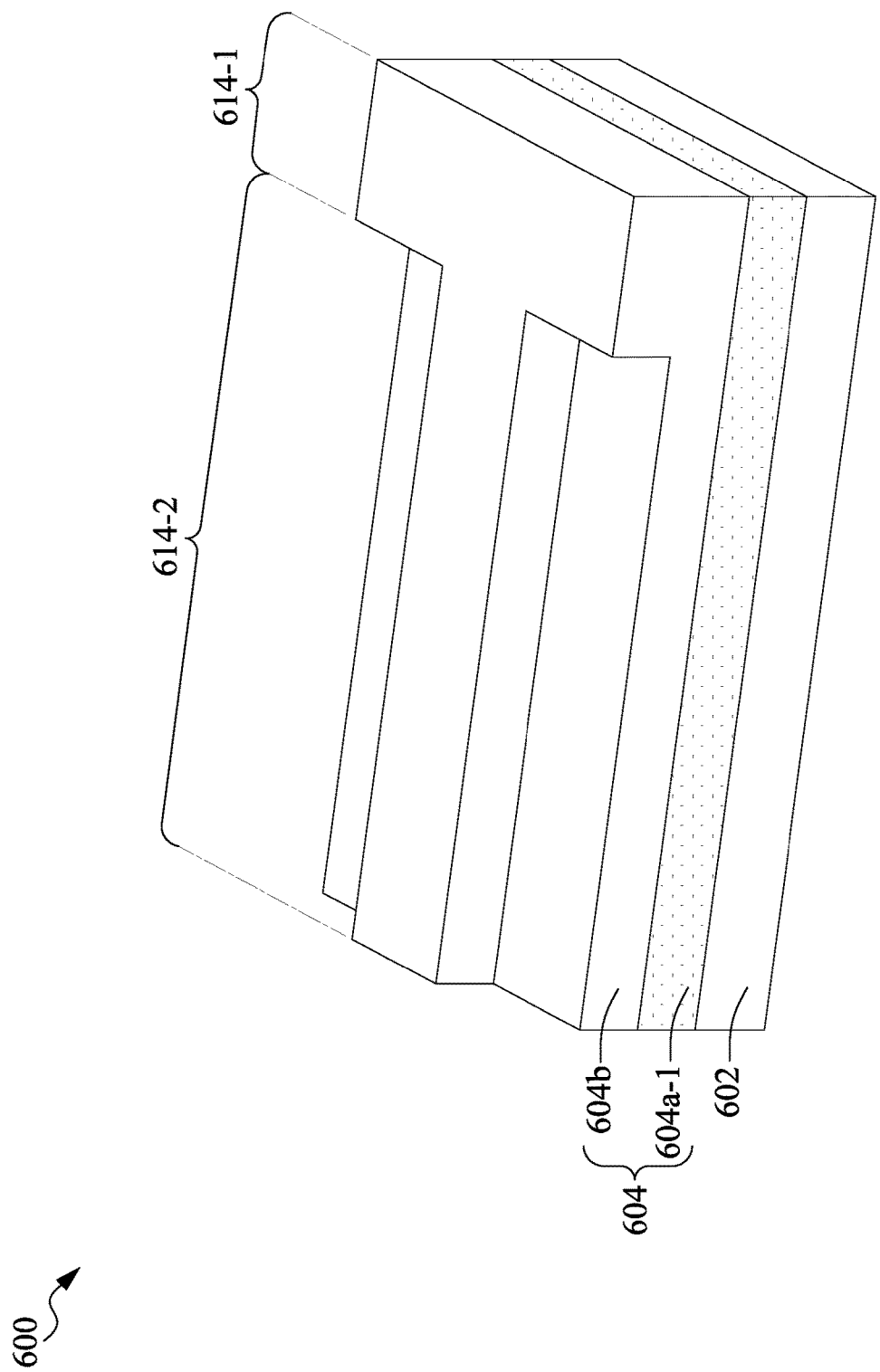
Figure 31:
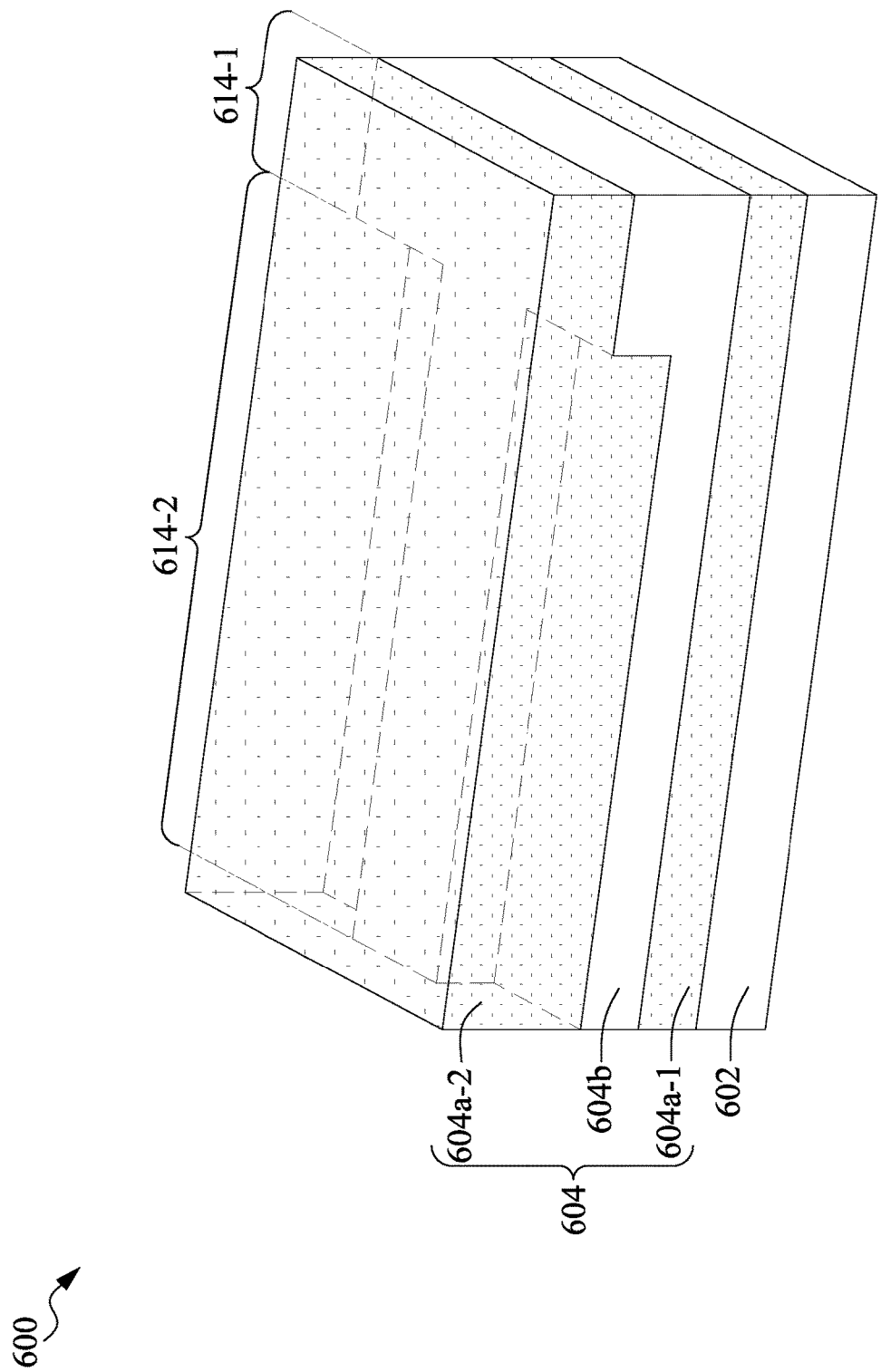

Referring to FIG. 30, the layer 604b may be patterned. In some embodiments, a patterned hard mask (not shown) can be formed over the layer 604b for defining a location and a dimension of the layer 604b. In some embodiments, a top surface of the layer 604b has a T-shape. In other words, the layer 604b has a wider portion 614-1 and a narrower portion 614-2. In some embodiments, the T-shaped layer 604b may be configured to modulate a beam profile of optical signals. Referring to FIG. 31, after the layer 604b is patterned, the layer 604a-2 is formed over the layer 604b.

Figure 32:
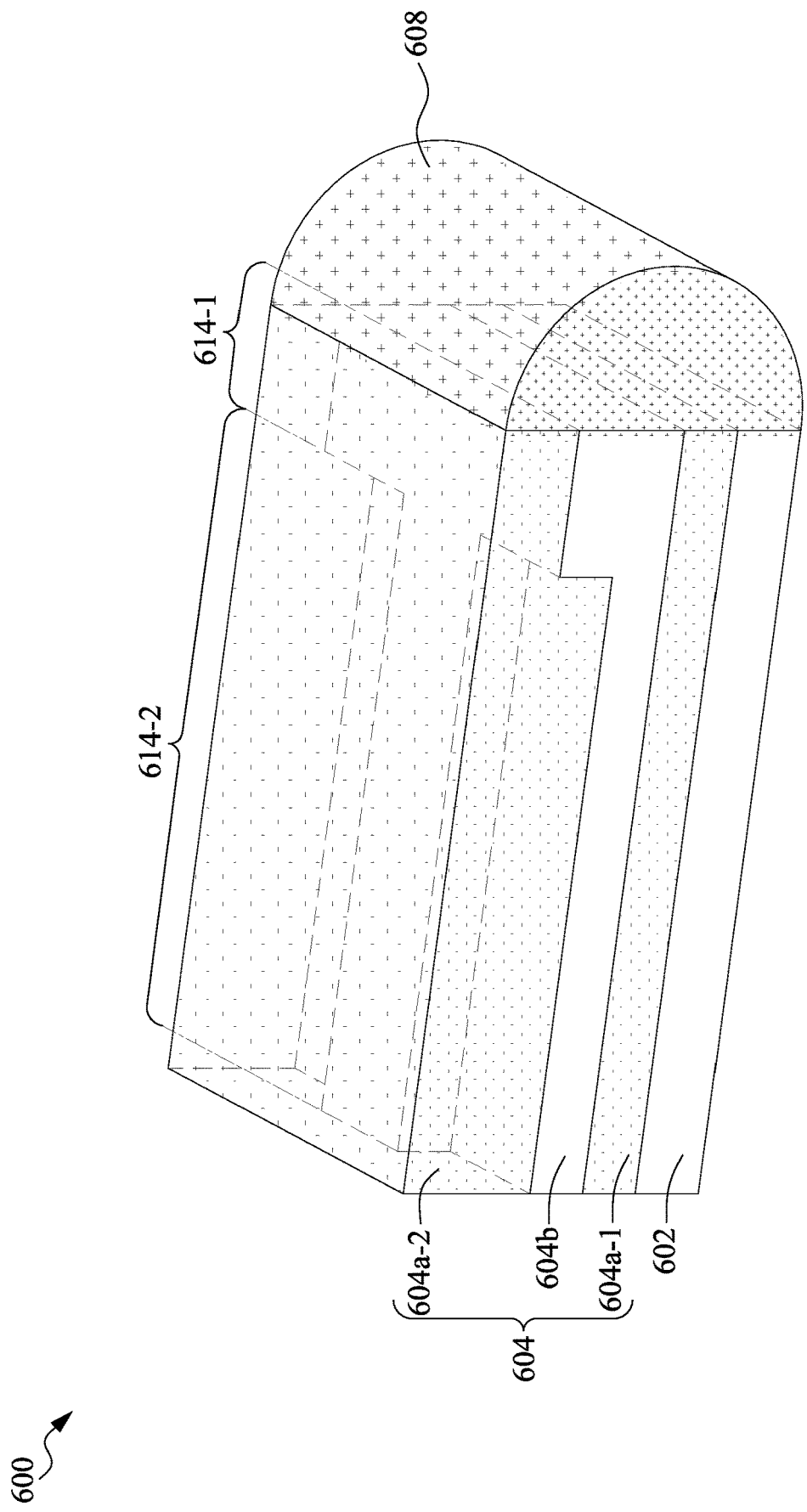

Referring to FIG. 32, an ARC layer 608 is formed. In some embodiments, the ARC layer 608 covers a sidewall of the stack structure 604. Alternatively or additionally, the ARC layer 608 covers the sidewall of the substrate 602, In some embodiments, the ARC layer 608 is formed adjacent to the wider portion 614-1 of the layer 604b. Owing to the thickness variation of the ARC layer 608 along the sidewall of the layer 604b (i.e., the core layer), a broadband wavelength of optical signals may be transmitted through the ARC layer 608. The thickness of the ARC layer 608 may be selected such that the broadband wavelength of the optical signals may be transmitted or collected through the ARC layer 608. In some embodiments, the thickness of the ARC layer 608 is substantially in a range between 150 nanometers and 250 nanometers.

The present disclosure provides embodiments of an edge coupler, a waveguide structure and a method for forming a waveguide structure. By forming an anti-reflection coating (ARC) layer as described above, a thickness of the ARC layer varies along a core layer. Accordingly, a broader wavelength range of optical signals may be collected through the ARC layer, such that a coupling efficiency of a waveguide structure may be improved, and beam pointing (or beam profile) of the waveguide structure may be improved.

In accordance with some embodiments of the present disclosure, an edge coupler is provided. The edge coupler includes a substrate, a first cladding layer, a core layer and a first anti-reflection coating layer. The substrate includes a first sidewall. The first cladding layer is disposed over the substrate. The first cladding layer has a second sidewall aligned with the first sidewall. The core layer is disposed over the first cladding layer. The core layer has a third sidewall aligned with the second sidewall. The first anti-reflection coating layer lines the first sidewall, the second sidewall and the third sidewall. A thickness of the first anti-reflection coating layer varies along the first sidewall, the second sidewall and the third sidewall.

In accordance with some embodiments of the present disclosure, a waveguide structure is provided. The waveguide structure includes a substrate, a stack structure and an anti-reflection coating layer. The stack structure is disposed over the substrate. The stack structure includes a plurality of first layers and a plurality of second layers arranged alternating with the plurality of first layers. A first refractive index of each of the plurality of first layers is different from a second refractive index of each of the plurality of second layers. The anti-reflection coating layer lines the stack structure and substrate. A third refractive index of the anti-reflection coating layer is less than the first refractive index or the second refractive index.

In accordance with some embodiments of the present disclosure, a method for forming a waveguide structure is provided. The method includes the following operations. A substrate is received. A stack structure is formed over the substrate. The stack structure includes a first layer and a second layer. A trench penetrating through the stack structure and exposing the substrate is formed. An anti-reflection coating layer covering the stack structure and an exposed surface of the substrate is formed. A plasma operation is performed over the anti-reflection coating layer. A thickness of the anti-reflection coating layer varies along a sidewall of the stack structure.

The foregoing outlines structures of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein, Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An edge coupler, comprising:
   a substrate including a first sidewall;
   a first cladding layer over the substrate, the first cladding layer having a second sidewall aligned with the first sidewall;
   a core layer over the first cladding layer, the core layer having a third sidewall aligned with the second sidewall; and
   a first anti-reflection coating layer lining the first sidewall, the second sidewall and the third sidewall, wherein a thickness of the first anti-reflection coating layer varies along the first sidewall, the second sidewall and the third sidewall,
   wherein the first anti-reflection coating layer has a first thickness along the first sidewall and a second thickness along the second sidewall, and the second thickness is greater than the first thickness.

2. The edge coupler of claim 1, wherein the first anti-reflection coating layer has a third thickness along the third sidewall, and the third thickness is greater than the second thickness.

3. The edge coupler of claim 1, wherein the first anti-reflection coating layer further covers a top surface of the core layer.

4. The edge coupler of claim 3, wherein a first height of the first anti-reflection coating layer varies along the top surface of the core layer.

5. The edge coupler of claim 1, wherein the first anti-reflection coating layer physically contacts and covers a top surface of the substrate.

6. The edge coupler of claim 5, wherein a second height of the first anti-reflection coating layer varies along the top surface of the substrate.

7. The edge coupler of claim 1, further comprising:
   a second cladding layer between the core layer and the first anti-reflection coating layer, wherein the second cladding layer has a vertical sidewall aligned with the third sidewall and a tilted sidewall coupled with the vertical sidewall.

8. The edge coupler of claim 7, wherein the thickness of the first anti-reflection coating layer varies along the first sidewall, the second sidewall, the third sidewall and the vertical sidewall.

9. The edge coupler of claim 7, further comprising:
   a second anti-reflection coating layer over the second cladding layer.

10. The edge coupler of claim 9, wherein a height of the second anti-reflection coating layer varies along a top surface of the second cladding layer.

11. The edge coupler of claim 1, wherein the first cladding layer comprises a dielectric layer, and the core layer comprises a semiconductor layer.

12. The edge coupler of claim 1, wherein a refractive index of the core layer is different from a refractive index of the first cladding layer.

13. The edge coupler of claim 12, wherein the refractive index of the core layer is greater than the refractive index of the first cladding layer.

14. A waveguide structure, comprising:
   a substrate;
   a stack structure over the substrate, the stack structure comprising a plurality of first layers and a plurality of second layers arranged alternating with the plurality of first layers, wherein a first refractive index of each of the plurality of first layers is different from a second refractive index of each of the plurality of second layers; and
   an anti-reflection coating layer lining the stack structure and substrate, wherein a third refractive index of the anti-reflection coating layer is less than the first refractive index or the second refractive index,
   wherein the anti-reflection coating layer further covers a top surface of the stack structure, and a height of the anti-reflection coating layer varies along the top surface of the stack structure.

15. The waveguide structure of claim 14, wherein a thickness of the anti-reflection coating layer varies along the stack structure.

16. A method for forming a waveguide structure, comprising:
   receiving a substrate;
   forming a stack structure over the substrate, the stack structure comprising a first layer and a second layer;
   forming a trench penetrating through the stack structure and exposing the substrate;
   depositing an anti-reflection coating layer covering the stack structure and an exposed surface of the substrate; and performing a plasma operation over the anti-reflection coating layer, wherein a thickness of the anti-reflection coating layer varies along a sidewall of the stack structure.

17. The method of claim 16, wherein at least a top portion of the stack structure is removed after the plasma operation.

18. The method of claim 16, wherein the stack structure remains substantially intact after the plasma operation.

19. The method of claim 16, further comprising:
removing a portion of the anti-reflection coating layer over a top surface of the stack structure.

20. The method of claim 16, wherein a refractive index of the first layer is different from a refractive index of the second layer.

* * * * *